(12) United States Patent
Oda

(10) Patent No.: US 11,493,524 B2
(45) Date of Patent: Nov. 8, 2022

(54) TRANSPORT SYSTEM, SAMPLE ANALYZER, SAMPLE RACK, AND TRANSPORT REGULATION METHOD

(71) Applicant: SYSMEX CORPORATION, Kobe (JP)

(72) Inventor: Kohei Oda, Kobe (JP)

(73) Assignee: SYSMEX CORPORATION, Kobe (JP)

(*) Notice: Subject to any disclaimer, the term of this patent is extended or adjusted under 35 U.S.C. 154(b) by 257 days.

(21) Appl. No.: 16/553,871

(22) Filed: Aug. 28, 2019

(65) Prior Publication Data

US 2020/0072855 A1 Mar. 5, 2020

(30) Foreign Application Priority Data

Aug. 31, 2018 (JP) .............................. JP2018-163499

(51) Int. Cl.
*G01N 35/00* (2006.01)
*G01N 35/02* (2006.01)

(52) U.S. Cl.
CPC ..... *G01N 35/00871* (2013.01); *G01N 35/026* (2013.01)

(58) Field of Classification Search
CPC ..... G01N 35/00871; G01N 2035/0465; G01N 35/026; G01N 35/04; G01N 2035/0415
See application file for complete search history.

(56) References Cited

U.S. PATENT DOCUMENTS

| 8,329,102 | B2  |   | 12/2012 | Koike  |              |
|-----------|-----|---|---------|--------|--------------|
| 9,891,241 | B2  | * | 2/2018  | Mori   | G01N 35/1004 |
| 2005/0074363 | A1 | * | 4/2005 | Dunfee | G01N 35/1004 |
|           |     |   |         |        | 422/81       |
| 2015/0346231 | A1 | * | 12/2015 | Mori  | G01N 35/1004 |
|           |     |   |         |        | 422/67       |
| 2018/0149667 | A1 |   | 5/2018  | Sasaki et al. |       |
| 2019/0339296 | A1 | * | 11/2019 | Mori  | B01D 19/0036 |

FOREIGN PATENT DOCUMENTS

| EP | 0759406 A1   | 2/1997  |
|----|--------------|---------|
| EP | 2620776 A1   | 7/2013  |
| JP | H08-304414 A | 11/1996 |

(Continued)

OTHER PUBLICATIONS

Extended European search report dated Jan. 23, 2020 in a counterpart European patent application No. 19194332.3.

(Continued)

*Primary Examiner* — Shogo Sasaki
(74) *Attorney, Agent, or Firm* — Crowell & Moring LLP

(57) ABSTRACT

A transport system includes a sample rack configured to hold a sample and comprising a notch; a rack storage unit in which the sample rack is stored; a transport path arranged to transport the sample rack moved from the rack storage unit; and a regulating member configured to regulate movement of the sample rack from the rack storage unit toward the transport path, wherein the regulating member is provided at a position corresponding to the notch provided in the sample rack, and enters an interior of the sample rack from the notch and abuts an interior wall of the sample rack as the sample rack moves from the rack storage unit toward the transport path.

8 Claims, 16 Drawing Sheets

(56) References Cited

FOREIGN PATENT DOCUMENTS

| | | |
|---|---|---|
| JP | H10-120167 A | 5/1998 |
| JP | H10-123146 A | 5/1998 |
| JP | 2002-311035 A | 10/2002 |
| JP | 2003-083993 A | 3/2003 |
| JP | 2006-275567 A | 10/2006 |
| JP | 2011-179919 A | 9/2011 |
| JP | 2012-013478 A | 1/2012 |
| JP | 5319239 B | 10/2013 |

OTHER PUBLICATIONS

Japanese Office Action dated Feb. 4, 2020 in a counterpart Japanese patent application No. 2018-163499.
Communication pursuant to Article 94(3) EPC dated Feb. 25, 2022 in European patent application No. 19194332.3.

* cited by examiner

FIG. 1A First embodiment
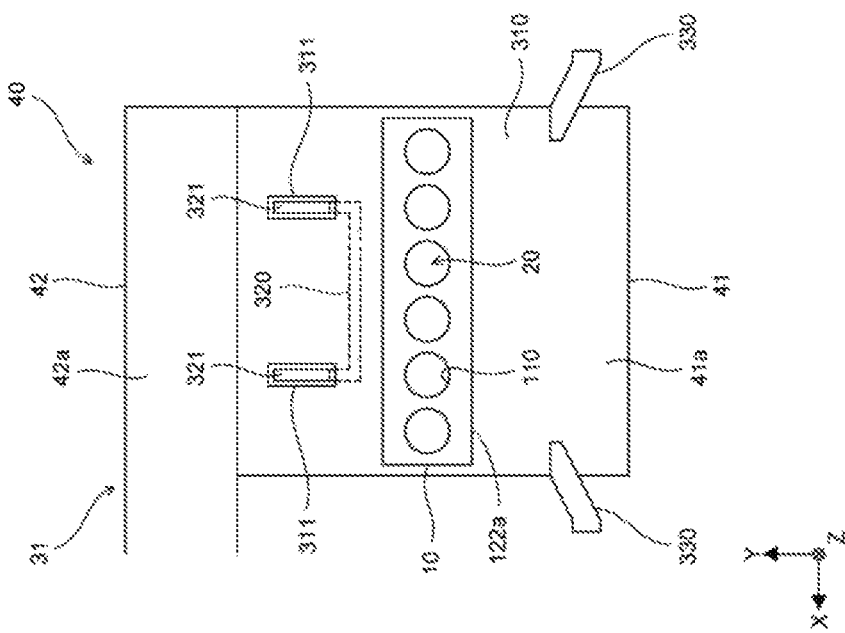
FIG. 1B
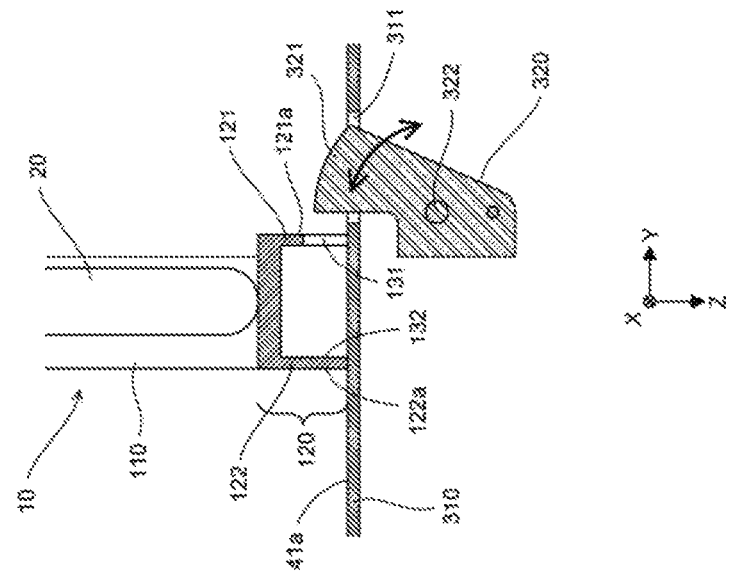

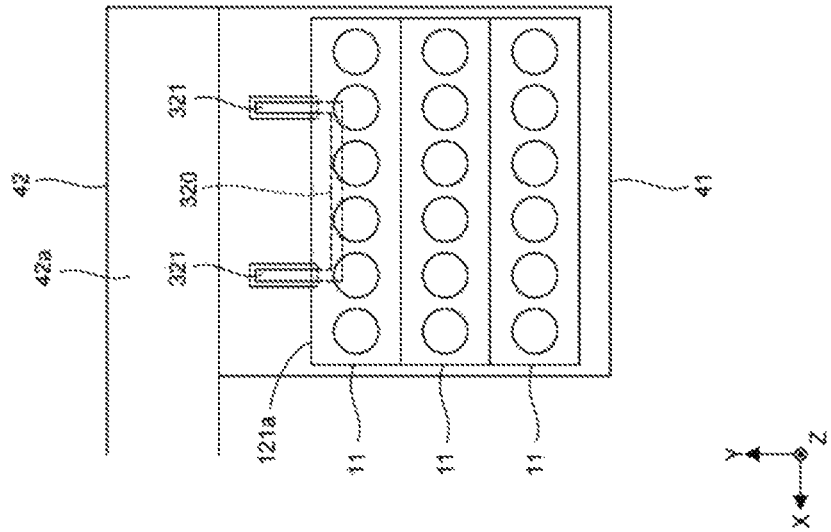
FIG. 3B Comparative example
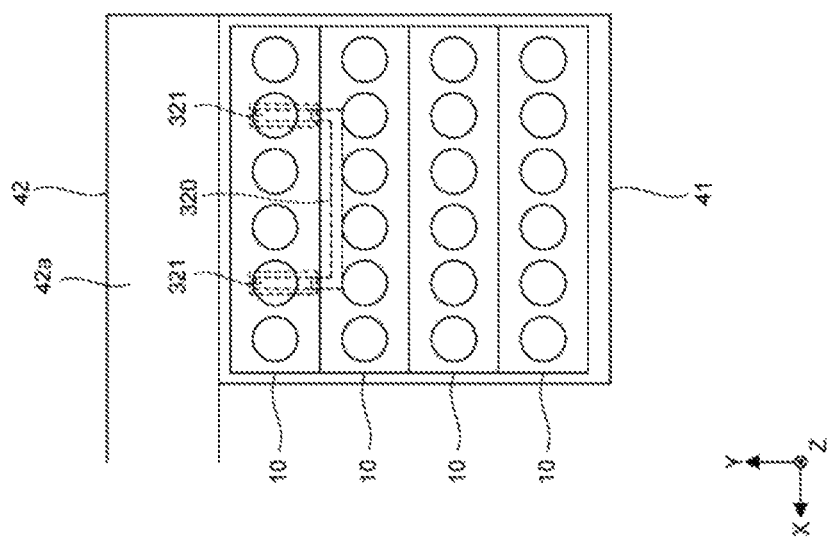
FIG. 3A

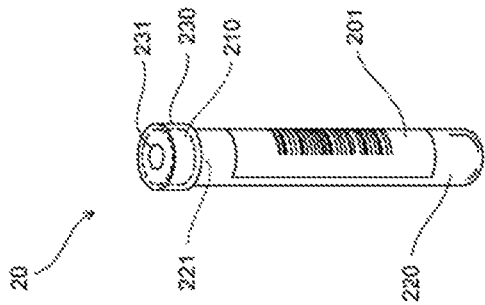
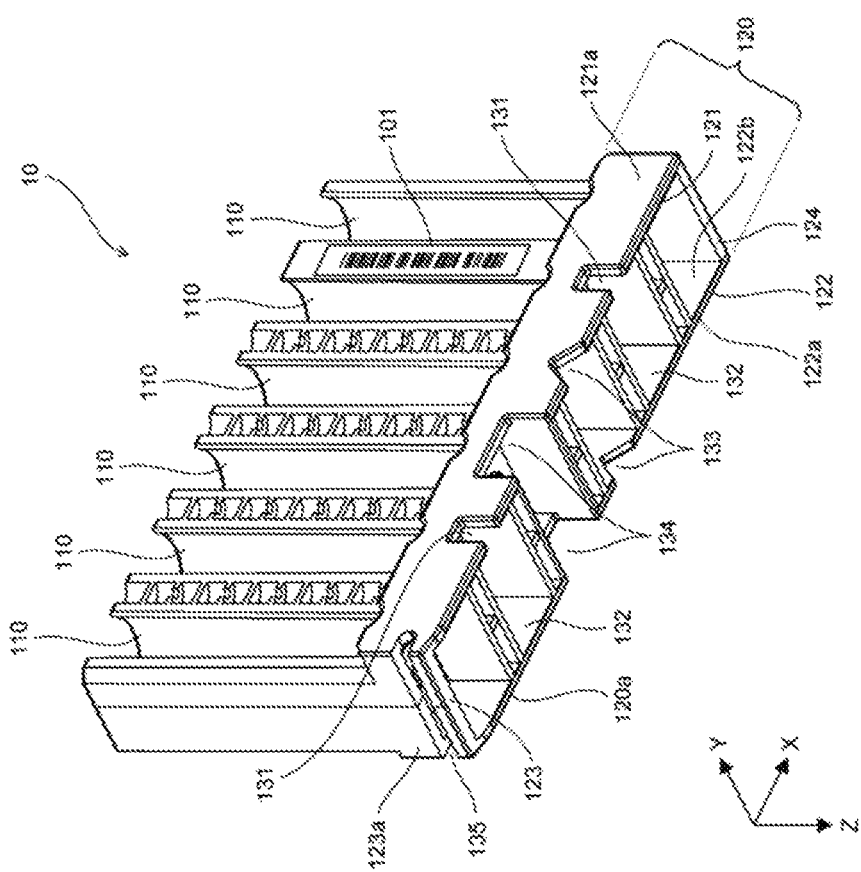

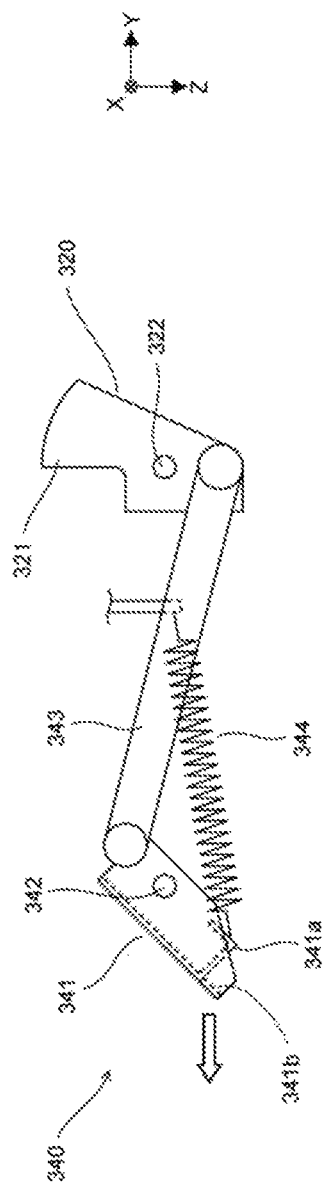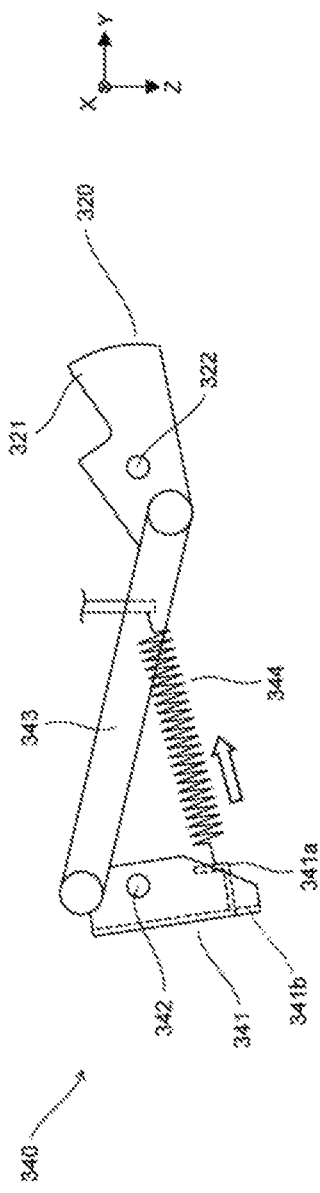

FIG. 12A  Second embodiment
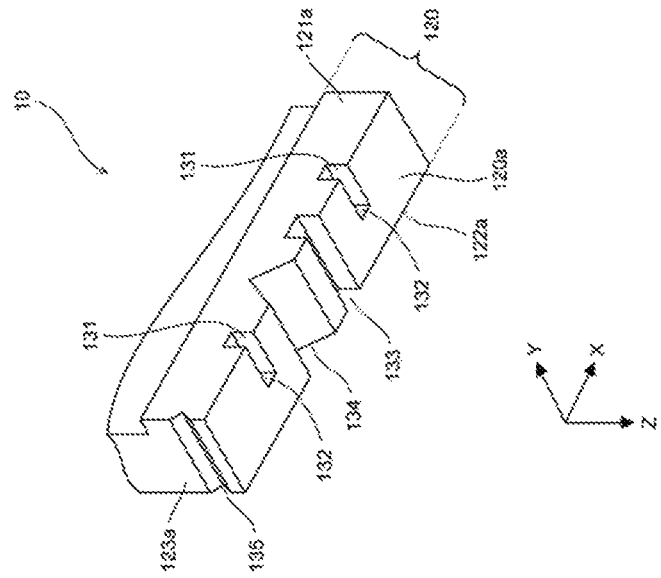
FIG. 12B
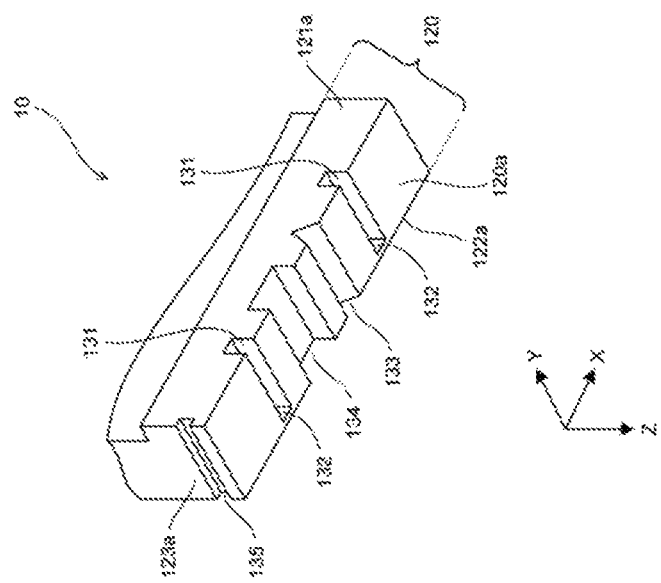

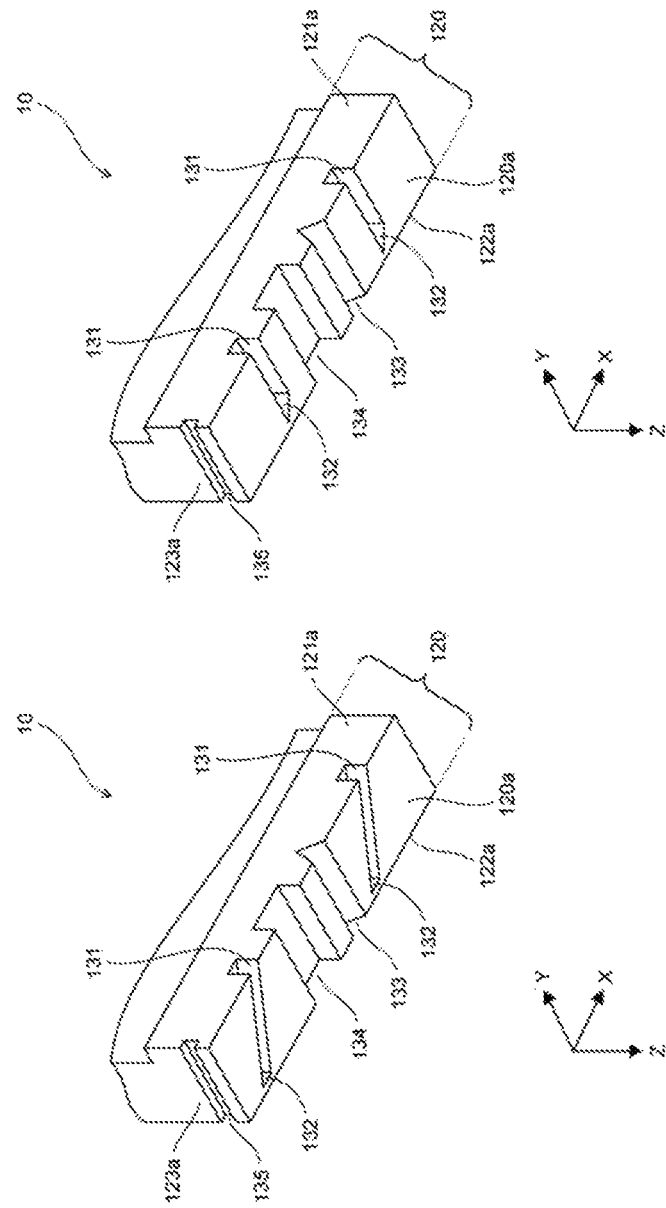

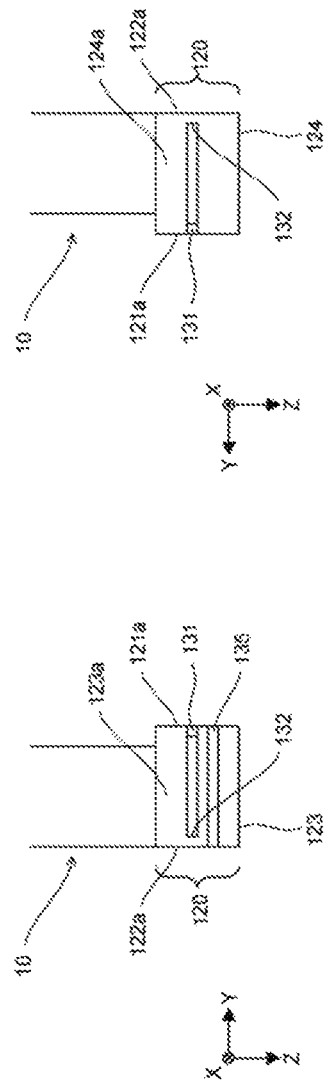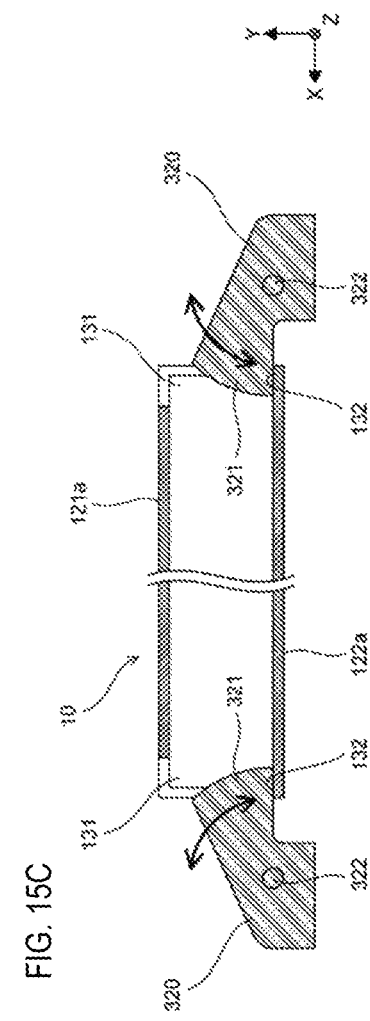

TRANSPORT SYSTEM, SAMPLE ANALYZER, SAMPLE RACK, AND TRANSPORT REGULATION METHOD

RELATED APPLICATIONS

This application claims priority from prior Japanese Patent Application No. 2018-163499, filed on Aug. 31, 2018, entitled "Transport System, Sample Analyzer, Sample Rack, and Transport Regulation Method", the entire contents of which are incorporated herein by reference.

BACKGROUND OF THE INVENTION

1. Field of the Invention

The present invention relates to a transport system, a sample analyzer, a sample rack, and a transport regulation method.

2. Description of the Related Art

Japanese Patent Application Publication No. 2011-179919 discloses a sample analyzer for analyzing components contained in a plasma sample using a coagulation method, a synthetic substrate method, an immunoturbidimetric method and an agglutination method by irradiating light on a measurement sample prepared by adding reagent to a plasma sample. In the sample analyzer described in Japanese Patent Application Publication No. 2011-179919 shown in FIG. 16, the sample rack 510 set in the rack set area 501 is transported in the back direction along the rack set area 501 to the right end of the transport area 502. The sample rack 510 positioned at the right end of the transport area 502 is transported leftward along the transport area 502. When the sample container 520 is positioned at the sample suction positions 531 and 532, the sample stored in the sample container 520 is suctioned by the sample dispensing units 541 and 542.

SUMMARY OF THE INVENTION

In the sample analyzer as described above, it is desirable to make a rack storage unit for storing a sample rack compact while ensuring a certain number of sample racks can be stored in the rack storage unit.

A first aspect of the present invention relates to a transport system. The transport system (40) according to this aspect includes a sample rack (10) for holding a sample, a rack storage unit (41) for storing the sample rack (10), a transport path (42a) for transporting the sample rack (10) stored in the rack storage unit (40), and a regulating member (320) for regulating the movement of the sample rack (10) from the rack storage unit (41) to the transport path (42a). The regulating member (320) is disposed at a position corresponding to a notch (131) provided in the sample rack (10), and enters the interior of the sample rack (10) from the notch (131) and abuts the interior wall (132) of the sample rack (10) as the sample rack (10) moves from the rack storage unit (41) toward the transport path (42a).

The regulating member may be provided to the rack storage unit in order to prevent the sample rack from being unintentionally moved from the rack storage unit. However, simply providing the regulating member reduces the number of sample racks that can be set in the rack storage unit, and increases the size of the rack storage unit if it is attempted to increase the number of sample racks that can be set.

On the other hand, according to the transport system of this aspect, when movement of the sample rack from the rack storage unit to the transport path is regulated, the regulating member enters the inside of the sample rack from the notch, and abuts an inner wall of the sample rack. That is, movement of the sample rack is regulated in a state in which the positions of the regulating member and the sample rack overlap. In this way the movement of the sample rack can be regulated in a state in which the sample rack is brought close to the transport path as compared with when the movement of the sample rack is restricted by bringing the regulating member into contact with the outer surface of the sample rack. Hence, the rack storage unit can be made more compact while ensuring a certain number of sample racks can be set in the rack storage unit. Since the operator can slide the sample rack relative to the regulating member and set the sample rack in the rack storage unit, the operator can smoothly set the sample rack in the rack storage unit.

In the transport system (40) according to this aspect, the sample rack (10) includes, aligned in one direction, a plurality of container holding parts (110) for holding the sample containers (20) containing the samples, a pedestal (120) having two side surfaces (121a, 122a) parallel to the direction in which the container holding parts (110) are arranged and disposed below the container holding parts (110), a notch (131) provided on one of the two side surfaces (121a, 122a) for receiving entry of the regulating member (320) into the interior of the pedestal (120), and a wall (132) for restricting the entrance of the regulating member (320) through the notch (131) at a predetermined position up to the other side surface (122a) of the two side surfaces (121a, 122a).

When movement of the sample rack from the rack storage unit to the transport path is regulated in this way, the regulating member enters the notch provided on one side surface of the sample rack set in the rack storage unit, and the entry of the regulating member is restricted to the wall at a predetermined position up to the other side surface. That is, movement of the sample rack is regulated in a state in which the positions of the regulating member and the sample rack overlap. In this way the movement of the sample rack can be regulated in a state in which the sample rack is brought close to the transport path, as compared with when the movement of the sample rack is regulated by bringing the regulating member into contact with one side surface. Hence, the rack storage unit can be made more compact while ensuring a certain number of sample racks can be set in the rack storage unit. Since the operator can slide the sample rack relative to the regulating member and set the sample rack in the rack storage unit, the operator can smoothly set the sample rack in the rack storage unit.

In the transport system (40) according to this aspect, the pedestal (120) includes two plate members (121, 122) each having an outer side surface on one side surface (121a) and the other side surface (122a), and the wall (132) may be configured by the inner side surface (122b) of the plate member (122) on the side of the other side surface (122a). In this way the weight of the sample rack can be reduced since a space is provided between the two plate members.

In the transport system (40) according to this aspect, the wall (132) may be provided at a position close to the other side surface (122a). In this way the regulating member can be further advanced into the pedestal. When movement of the sample rack is regulated in this way, the sample rack can be brought closer to the transport path, so that that space for setting the sample rack in the rack storage unit can be increased.

In the transport system (40) according to this aspect, the sample rack includes at least two notches (131) disposed on one side surface (121*a*) to receive the entry of at least two hooks (321) into the interior of the pedestal (120), and the regulating member (320) includes the at least two hooks (321) provided at positions corresponding to the at least two notches (131) on the side surface (121*a*) of the sample rack 10). In this way, movement of the sample rack can be regulated stably.

In the transport system (40) according to this aspect, the sample rack (10) includes an engagement part (133) for engaging with the protrusion (312) provided on the bottom surface (41*a*) of the rack storage unit (41) and extending in the direction toward the transport path (42*a*). In this way the movement of the sample rack in the rack storage unit is performed with the engagement part along the protrusion provided on the bottom surface of the rack storage unit. Therefore, the operator can reliably set the sample rack in the rack storage unit by sliding the sample rack relative to the regulating member in a state in which the engagement part is along the protrusion. A feed member for transporting the sample rack set in the rack storage unit to the transport path can reliably transport the sample rack to the transport path along the transport direction.

In the transport system (40) according to this aspect, the sample rack (10) can be configured with an engagement part (135) to engage with the protrusion (313) provided on the side portion of the rack storage unit (41) and extending in the direction toward the transport path (42*a*). In this way the movement of the sample rack in the rack storage unit is performed in a state in which the engagement part is along the protrusion provided on the side portion of the rack storage unit. Therefore, the operator can reliably set the sample rack in the rack storage unit by sliding the sample rack relative to the regulating member in a state in which the engagement part is along the protrusion. A feed member for transporting the sample rack set in the rack storage unit to the transport path can reliably transport the sample rack to the transport path along the transport direction.

The transport system (40) according to this aspect is configured so that the sample rack (10) includes an engagement part (134) provided on the bottom surface (120*a*) of the sample rack (10) for engaging a protrusion (361) on a belt (360) for transporting the sample rack (10) in the transport path (42*a*). In this way the sample rack can be transported along the transport path with a simple configuration.

The transport system (40) according to this aspect includes a feed member (330) that feeds the sample rack (10) stored in the rack storage unit (41) to the transport path (42*a*), and a regulating member (320) configured to retract from the inside of the rack storage unit (41) when the sample rack (10) stored in the rack storage unit (41) is fed into the transport path (42*a*). In this way, the sample rack can be smoothly fed from the rack storage unit to the transport path.

The transport system (40) according to this aspect includes a measurement unit (32) configured to measure a sample transported through the transport path (42*a*), and an analysis unit (33) configured to analyze the sample based on the measurement results of the measurement unit (32).

A second aspect of the present invention relates to a sample analyzer (30). The sample analyzer (30) according to this aspect includes a rack storage unit (41) for storing a sample rack (10) holding a sample, a transport path (42*a*) connected to the rack storage unit (41), a measurement unit (32) for measuring a sample transported through the transport path (42*a*), an analysis unit (33) that analyzes the sample based on the measurement result of the measurement unit (32), a regulating member (320) which protrudes inside the rack storage unit (41) and restricts the movement of the sample rack (10) from the rack storage unit (41) to the transport path (42*a*). The regulating member (320) is disposed at a position corresponding to a notch (131) provided in the sample rack (10), and enters the interior of the sample rack (10) from the notch (131) and abuts the interior wall (132) of the sample rack (10) as the sample rack (10) moves from the rack storage unit (41) toward the transport path (42*a*).

According to the sample analyzer of this aspect, the same effect as that of the first aspect is exerted.

The sample analyzer (30) according to this aspect includes a feed member (330) that feeds the sample rack (10) stored in the rack storage unit (41) to the transport path (42*a*), and a regulating member (320) configured to retract from the inside of the rack storage unit (41) when the sample rack (10) stored in the rack storage unit (41) is fed into the transport path (42*a*).

In the sample analyzer (30) according to this aspect, the regulating member (320) has two hooks (321) at positions corresponding to the two notches (131) provided on the side surface (121*a*) of the sample rack (10) (321) may be configured to be provided. In this way, movement of the sample rack can be regulated stably.

The sample analyzer (30) according to this aspect includes a protrusion (312) provided on the bottom surface (41*a*) of the rack storage unit (41) and extending in the transport direction of the sample rack (10) in the rack storage unit (41), and the protrusion (312) provided on the bottom surface (41*a*) of the rack storage section (41) is disposed at a position corresponding to the engagement part (133) provided on the bottom surface (120*a*) of the sample rack (10). In this way the movement of the sample rack in the rack storage unit is performed with the engagement part along the protrusion provided on the bottom surface of the rack storage unit. Therefore, the operator can reliably set the sample rack in the rack storage unit by sliding the sample rack relative to the regulating member in a state in which the engagement part is along the protrusion. A feed member for transporting the sample rack set in the rack storage unit to the transport path can reliably transport the sample rack to the transport path along the transport direction.

The sample analyzer (30) according to this aspect is provided with a protrusion (313) on the side portion of the rack storage section (41) and extending in the transport direction of the sample rack (10) in the rack storage section (41), and the protrusion (313) on the side portion of the rack storage part (41) may be provided at a position corresponding to the engagement part (135) provided on the side surface (123*a*) of the sample rack (10). In this way the movement of the sample rack in the rack storage unit is performed in a state in which the engagement part is along the protrusion provided on the side portion of the rack storage unit. Therefore, the operator can reliably set the sample rack in the rack storage unit by sliding the sample rack relative to the regulating member in a state in which the engagement part is along the protrusion. A feed member for transporting the sample rack set in the rack storage unit to the transport path can reliably transport the sample rack to the transport path along the transport direction.

The sample analyzer (30) according to the present aspect includes a rack transport path (42) for transporting the sample rack (10) in the transport path (42*a*) and transport the sample held in the sample rack (10) to a suction position (375) of the measurement unit (32).

In this case, the rack transport unit (42) includes a belt (360) provided with a protrusion (361), and the sample rack (10) is transported in the transport path (42*a*) by driving the belt (360) in a state in which the protrusion (361) on the belt (360) is engaged with the engagement part (134) of the sample rack (10). In this way the rack transport unit can be simply configured since the sample rack can be transported to the suction position only by driving the belt.

A third aspect of the invention relates to a sample rack for use in a transport system including a rack storage unit (41) for storing a sample rack (10) for holding a sample, a transport path (42*a*) for transporting the sample rack (10) stored in the rack storage unit (41), and a regulating member (320) for regulating the movement of the sample rack (10) from the rack storage unit (41) toward the transport path (42*a*). The sample rack (10) according to this aspect includes a first surface (121*a*) which has a notch (131) formed therein to allow entry of the regulating member (320) into the interior of the sample rack (10) as the sample rack (10) moves from the rack storage unit (41) toward the transport path (42*a*), and a second surface (122*a*), that is, a wall (132), at a position corresponding to the notch (131).

According to the sample rack of this aspect, the same effects as in the first and second aspects are obtained.

In the sample rack (10) according to this aspect, the wall (132) may be provided at a position facing the notch (131). In this way the configuration and drive of the regulating member can be simplified.

A fourth aspect of the invention relates to a transport regulation method for regulating the transfer of the sample rack (10) stored in the rack storage unit (41) into the transport path (42*a*). In the transport regulation method according to this aspect, when the sample rack (10) is moved toward the transport path (42*a*) from a state of being stored in the rack storage unit (41), the movement of the sample rack (10) is regulated as the regulating member (320) which protrudes into the interior of the rack storage unit (41) enters the interior of the sample rack (10) from the notch (131) formed on the side surface (121*a*) of the sample rack (10), and abuts the interior wall (132) of the sample rack (10).

According to the transport regulation method of this aspect, the same effects as the first to third aspects can be obtained.

A fifth aspect of the present invention relates to a sample rack set in a rack storage unit (41) in a sample analyzer (30) in which the movement of the sample rack (10) from the rack storage unit (41) to the transport path (42*a*) is regulated by the regulating member (320) which protrudes into the rack storage unit (41). The sample rack (10) according to this aspect includes, aligned in one direction, a plurality of container holding parts (110) for holding the sample containers (20) containing the samples, a pedestal (120) having two side surfaces (121*a*, 122*a*) parallel to the direction in which the container holding parts (110) are arranged and disposed below the container holding parts (110), a notch (131) provided on one of the two side surfaces (121*a*, 122*a*) for receiving entry of the regulating member (320) into the interior of the pedestal (120), and a wall (132) for restricting the entrance of the regulating member (320) through the notch (131) at a predetermined position up to the other side surface (122*a*) of the two side surfaces (121*a*, 122*a*).

According to the sample rack of this aspect, the same effects as in the first to fourth aspects are obtained.

According to the present invention, it is possible to reduce the size of the rack storage unit while ensuring a certain number of sample racks can be set in the rack storage unit.

BRIEF DESCRIPTION OF THE DRAWINGS

FIGS. 1A and 1B show an outline of the structures of a transport system, a transport unit, and a sample rack according to a first embodiment; FIG. 1A is a plan view of the transport unit and the sample rack according to the first embodiment when viewed in the Z-axis positive direction; FIG. 1B is a side view of a cross section obtained by transecting the sample rack and the rack storage unit along the YZ plane passing through the hooks of the regulating member according to the first embodiment, as viewed in the positive X-axis direction;

FIG. 3A is a schematic view showing a sample rack set in the rack storage unit according to the first embodiment; FIG. 3B is a schematic view showing the sample rack set in the rack storage unit according to a comparative example;

FIG. 4A is a perspective view showing the structure of the sample rack according to the first embodiment; FIG. 4B is a perspective view showing the structure of the sample container according to the first embodiment;

FIGS. 7A and 7B are side views schematically showing the structures of the regulating member and a drive unit for driving the regulating member according to the first embodiment;

FIG. 12A is a perspective view schematically showing the structure of a sample rack according to the second embodiment; FIG. 12B is a perspective view schematically showing the structure of a sample rack according to a modification of the second embodiment;

FIG. 13A is a perspective view schematically showing the structure of a sample rack according to a modification of the second embodiment; FIG. 13B is a perspective view schematically showing the structure of a sample rack according to a modification of the second embodiment;

FIGS. 15A and 15B are schematic diagrams showing the structure when the sample rack according to a third embodiment is viewed in the X-axis positive direction and the X-axis negative direction, respectively; FIG. 15C is a plan view of a cross section obtained by transecting the sample rack and the rack storage unit along the XY plane passing through the hooks of the regulating member according to the third embodiment, as viewed in the positive Z-axis direction.

DETAILED DESCRIPTION OF THE PREFERRED EMBODIMENTS

First Embodiment

Figure 2A:
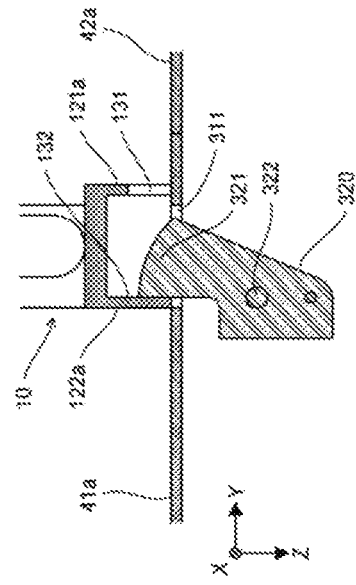
FIGS. 2A to 2D are schematic views illustrating the positional relationship between the sample rack and the regulating member according to the first embodiment.

The sample rack 10 described below is a rack for holding the sample container 20 and is used in the sample analyzer 30. The sample analyzer 30 includes a transport unit 31, a measurement unit 32, and an analysis unit 33. The transport unit 31 transports the sample rack 10, whereby the sample container 20 held in the sample rack 10 is transported to a position for suctioning the sample by the measurement unit 32. That is, the sample rack 10 is used to transport the sample to the measurement unit 32. The entire structure of the transport unit 31 will be described later with reference to FIG. 5. The structure of the sample analyzer 30 will be described later with reference to FIGS. 10 and 11.

The sample rack 10, the rack storage unit 41, the transport path 42a, the regulating member 320, the feed member 330, the measurement unit 32, and the analysis unit 33 configure a transport system 40. However, the transport system 40 may not necessarily include the feed member 330, the measurement unit 32, and the analysis unit.

The outlines of the structures of the transport unit 31 and the sample rack 10 will be described with reference to FIGS. 1A and 1B. In FIGS. 1A and 1B, the X, Y, and Z-axes are orthogonal to each other, and the X-axis direction and the Y-axis direction correspond to directions parallel to the horizontal plane. The X-axis positive direction corresponds to the left direction, the Y-axis positive direction corresponds to the backward direction, and the Z-axis positive direction corresponds to the vertically downward direction. Note that in the other drawings the XYZ axes are set in the same manner as in FIGS. 1A and 1B.

As shown in FIG. 1A, the transport unit 31 includes a rack storage unit 41 and a rack transport unit 42. The rack storage unit 41 includes a support member 310, a regulating member 320, and a feed member 330.

A sample rack 10 holding a plurality of sample containers 20 containing samples is set in the rack storage unit 41. The sample rack 10 set in the rack storage unit 41 is supported by the bottom surface 41a of the rack storage unit 41. The bottom surface 41a of the rack storage 41 unit is configured by the upper surface of the support member 310. The support member 310 is a plate member that spreads in the horizontal direction. The regulating member 320 has a U-shape as viewed in the Z-axis direction. Two hooks 321 are formed on the regulating member 320. The hooks 321 can be projected from the lower side of the bottom surface 41a into the inside of the rack storage unit 41 through the holes 311 formed in the support member 310.

The feed member 330 is a hook-shaped member provided at the end on the X-axis positive side and the end on the X-axis negative side of the rack storage unit 41. The feed member 330 is movable in the Y-axis direction. The tip of the feed member 330 is located in the Z-axis negative direction from the bottom surface 41a. The feed member 330 transports the sample rack 10 set in the rack storage unit 41 from the rack storage unit 41 to the rack transport unit 42 by pushing the side 122a on the Y-axis negative side of the sample rack 10 in the Y-axis positive direction.

As shown in FIG. 1B, the regulating member 320 is fixed to the shaft 322 so as to be rotatable about a shaft 322 extending in the X-axis direction. The rotation of the regulating member 320 about the shaft 322 causes the hook 321 to transition to a state of projecting above the bottom surface 41a via the hole 311 and a state of being positioned below the bottom surface 41a. That is, the regulating member 320 regulates the movement of the sample rack 10 from the rack storage unit 41 to the transport path 42a by protruding inside the rack storage unit 41.

The sample rack 10 includes a container holding part 110 and a pedestal 120. The container holding part 110 is a hole formed downward from the upper surface of the sample rack 10, and six of the container holding parts 110 are formed along the X-axis direction. The pedestal 120 is provided below the container holding part 110. The pedestal 120 includes a plate member 121 positioned at an end on the Y-axis positive side and a plate member 122 positioned at an end on the Y-axis negative side. The pedestal 120 has two side surfaces 121a and 122a as outer side surfaces. The side surface 121a is a surface on the Y-axis positive side of the plate member 121, and the side surface 122a is a surface on the Y-axis negative side of the plate member 122. The side surfaces 121a and 122a are parallel to the X-axis direction, which is the direction in which the container holding parts 110 are arranged.

The side surface 121a is provided with a notch 131 for receiving the entry of the regulating member 320 into the inside of the pedestal 120. The sample rack 10 also includes a wall 132 that restricts the entry of the regulating member 320 through the notch 131 at a predetermined position up to the side surface 122a. The wall 132 is an inner surface of the plate member 122, that is, a surface on the Y-axis positive side of the plate member 122.

Figure 2B:
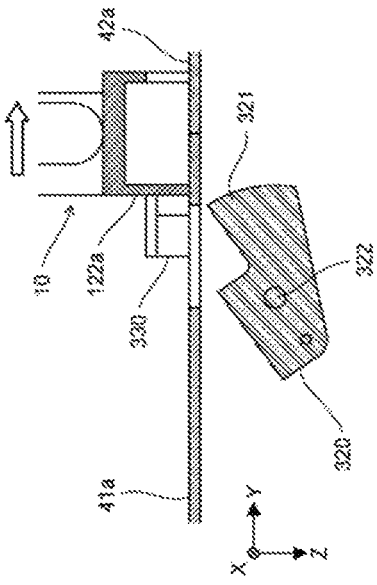

As shown in FIG. 2A, when the operator sets the sample rack 10 in the rack storage unit 41, the operator slides the sample rack 10 on the bottom surface 41a from the Y-axis negative side of the regulating member 320 toward the regulating member 320. At this time, the hook 321 of the regulating member 320 enters the inside of the sample rack 10 through the notch 131. Then, as shown in FIG. 2B, when the hooks 321 abut on the wall 132, the movement of the sample rack 10 in the Y-axis positive direction is restricted. Note that the operator can also place the sample rack 10 on the bottom surface 41a from above the regulating member 320 so as to be in the state shown in FIG. 2B when the sample rack 10 is not at the position of the regulating member 320.

Figure 2C:
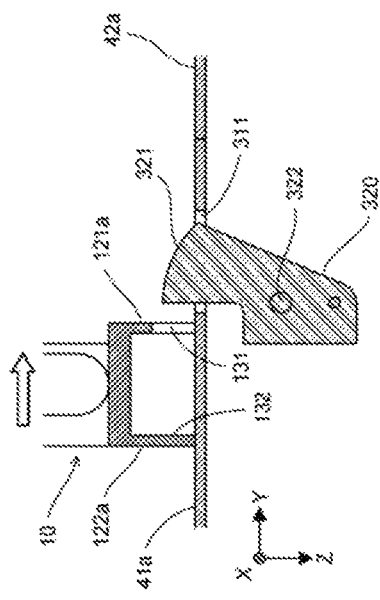
Figure 2D:
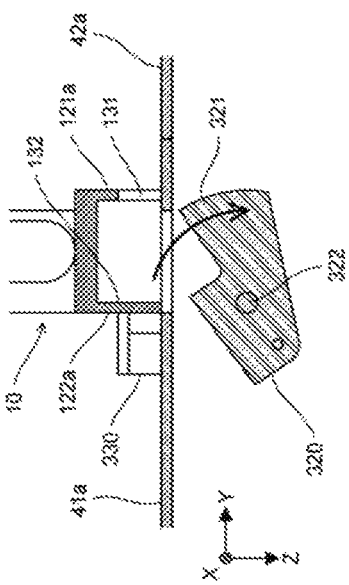

As shown in FIG. 2C, when the feed member 330 feeds the sample rack 10, the regulating member 320 is rotated about the shaft 322, and the hook 321 is positioned below the bottom surface 41a. Then, the feed member 330 pushes the side surface 122a on the Y-axis negative side of the pedestal 120 in the Y-axis positive direction. In this way the sample rack 10 is transported in the Y-axis positive direction, and is sent out from the rack storage unit 41 to the transport path 42a as shown in FIG. 2D.

FIGS. 3A and 3B show a state in which the maximum number of sample racks that can be set is set in the rack transport unit 42 when the movement of the sample rack 10 is regulated. FIG. 3A shows a case in which the sample rack 10 of the first embodiment is used, and FIG. 3B shows a case in which the sample rack 11 of the comparative example is used. The notch 131 is not formed in sample rack 11 of the comparative example compared with the sample rack 10 of the first embodiment.

In the case of the first embodiment, as shown in FIG. 3A, the operator sets one sample rack 10 in a state of being regulated by the regulating member 320 as shown in FIG. 2B, then the other sample racks 10 are set side by side on the Y-axis negative side of the sample rack 10. In this way a total of four sample racks 10 are set in the rack storage unit 41.

On the other hand, in the comparative example shown in FIG. 3B, since the notch 131 is not provided in the sample rack 11, the operator can set the sample rack 10 in the rack storage unit 41 so that the hook 321 of the regulating member 320 abuts the side surface 121a on the Y-axis positive side of the sample rack 11. Then, the sample racks 11 are aligned and set on the Y-axis negative side of the sample rack 11. In this way a total of three sample racks 10 are set in the rack storage unit 41.

As described above, the regulating member 320 is provided to the rack storage unit 41 in order to prevent the sample rack 10 from being unintentionally moved from the rack storage unit 41. However, if regulating member 320 is provided, for example, in the case of the comparative example, the number of sample racks 11 that can be set in the rack storage unit 41 is reduced, and if it is attempted to increase the number of sample racks 11 that can be set, the rack storage unit 41 will become larger.

In contrast, in the first embodiment, when movement of the sample rack 10 from the rack storage unit 41 to the transport path 42a is restricted, the regulating member 320 enters the notch 131 provided on one side surface 121a of the sample rack 10 set in the rack storage unit 41, and this entrance of the regulating member 320 is regulated by the wall 132 at a predetermined position from the other side surface 122a. That is, as shown in FIG. 3A, the movement of the sample rack 10 is regulated in a state where the positions of the regulating member 320 and the sample rack 10 overlap. In this way the movement of the sample rack 10 is regulated in a state in which the sample rack 10 is brought closer to the transport path 42a compared to when the movement of the sample rack is restricted by bringing the regulating member 320 into contact with one side surface 121a, as shown in FIG. 3B.

Hence, the size of the rack storage unit 41 can be reduced while ensuring the extent to which a number of sample racks 10 can be set in the rack storage unit 41. That is, in the first embodiment shown in FIGS. 3A and 3B, more sample racks 10 can be set than in the comparative example. In the case of the comparative example, it also is necessary to increase the width in the Y-axis direction of the rack storage rack 41 in order to be able to set the number of sample racks similar to that of the first embodiment. Therefore, in the first embodiment, the size of the rack storage unit 41 can be reduced as compared with the comparative example.

The operator also can slide the sample rack 10 in the Y-axis positive direction relative to the regulating member 320 to set the sample rack 20 in the rack storage unit 41, so the operator can smoothly set the sample rack 10 in the rack storage section 41.

The same effect as described above is also obtained in the transport system 40 including the sample rack 10, the rack storage unit 41, the transport path 42a, and the restricting member 320. That is, when movement of the sample rack 10 from the rack storage unit 41 to the transport path 42a is regulated, the regulating member 320 enters the interior of the sample rack 10 from the notch 131 and abuts the wall 132. That is, movement of the sample rack 10 is regulated in a state where the positions of the regulating member 320 and the sample rack 10 overlap. In this way the movement of the sample rack 10 is performed in a state in which the sample rack 10 is brought closer to the transport path 42a as compared with the case in which the movement of the sample rack 10 is restricted by bringing the regulating member 320 into contact with the side surface 121a of the sample rack 10. Hence, the size of the rack storage unit 41 can be reduced while ensuring the extent to which a number of sample racks 10 can be set in the rack storage unit 41. The operator can smoothly set the sample rack 10 in the rack storage unit 41 since the operator can slide the sample rack 10 relative to the regulating member 320 and set the sample rack 10 in the rack storage unit 41.

Next, detailed structures of the sample rack 10 and the transport unit 31 will be described.

As shown in FIG. 4A, the outer shape of the sample rack 10 is a substantially rectangular parallelepiped, and the width in the X-axis direction is longer than the width in the Y-axis direction. The container holding part 110 holds the sample container 20 in an upright state in the Z-axis direction. When the sample rack 10 includes a plurality of container holding parts 110, a plurality of samples can be transported to the measurement unit 32 by transport of one sample rack 10. Note that the number of container holding parts 110 formed in the sample rack 10 is not limited to six, and may be another number.

An identification member 101 also is attached to the Y-axis positive side of the sample rack 10. The identification member 101 is a barcode label on which a barcode indicating rack information is printed. The rack information is information that can individually identify the sample rack 10.

The pedestal 120 includes plate members 121 and 122 parallel to the XZ plane and plate members 123 and 124 parallel to the YZ plane. The plate members 121 and 122 are located on the Y-axis positive side and the Y-axis negative side of the pedestal 120, respectively. The plate members 123 and 124 are located on the X-axis negative side and the X-axis positive side of the pedestal 120, respectively. The side surface 121a on the Y-axis positive side of the plate member 121, the side surface 122a on the Y-axis negative side of the plate member 122, and the side surface 123a on the X-axis negative side of the plate member 123 form the outer side surfaces of the pedestal 120. The inner side surface 122b on the Y-axis positive side of the plate member 122 is illustrated in FIG. 4A.

The bottom surface 120a of the pedestal 120 is formed by the lower ends of the plate members 121 to 124. A cavity is formed inside the pedestal 120 circumscribed by the plate members 121 to 124, and the cavity is open in the Z-axis positive direction. In other words, a concavity is formed on the bottom surface 120a of the pedestal 120 circumscribed by the plate members 121 to 124.

Two notches 131 are formed in the plate member 121, and a wall 132 is formed on the inner side surface 122b of the plate member 122 so as to face the two notches 131. As shown in FIG. 4A, the wall 132 of the first embodiment is configured by the inner side surface 122b of the plate member 122. Thus, when a space is provided between the two plate members 121 and 122, the weight of the sample rack 10 can be reduced. When the two notches 131 are provided on the side surface 121a, the movement of the sample rack 10 can be stably regulated by the two hooks 321 of the regulating member 320. Note that the number of notches 131 provided in the sample rack 10 is not limited to two, and may be one or three or more in accordance with the number of hooks 321.

Since the wall 132 is configured by the inner side surface 122b, the wall 132 is provided at a position close to the side surface 122a. In this way the regulating member 320 can be further advanced into the pedestal 120 through the notch 131. Therefore, when movement of the sample rack 10 is regulated by the regulating member 320, the sample rack 10 can be brought closer to the transport path 42*a*. Hence, the space for setting the sample rack 10 in the rack storage unit 41 can be increased.

An engagement part 133 is provided on the bottom surface 120*a* of the sample rack 10. The engagement part 133 of the first embodiment is a notch provided on the side surfaces 121*a* and 122*a*. The two notches forming the engagement part 133 are provided to face each other in the Y-axis direction. The engagement part 133 has a triangular shape when viewed in the Y-axis direction. The engagement part 133 engages with a protrusion 312 provided on the bottom surface 41*a* of the rack storage unit 41 and extends in the direction toward the transport path 42*a* as described later.

Similarly, an engagement part 134 is provided on the bottom surface 120*a* of the sample rack 10. The engagement part 134 of the first embodiment is a notch provided on the side surfaces 121*a* and 122*a*. The two notches that configure the engagement part 134 are provided to face each other in the Y-axis direction. The engagement part 134 has a rectangular shape when viewed in the Y-axis direction. The engagement part 134 engages with a protrusion 361 provided on the belt 360 for transporting the sample rack 10 in the transport path 42*a* as described later.

An engagement part 135 is provided on the side surface 123*a* of the sample rack 10. The engagement part 135 is a notch formed in the plate member 123 and penetrates the plate member 123 in the Y-axis direction. The engagement part 135 engages with a protrusion 313 which is provided on the side portion of the rack storage unit 41 and extends in the direction toward the transport path 42*a*, as described later.

As shown in FIG. 4B, the sample container 20 includes an identification member 201, a stopper 210, a body 220, and a lid 230.

The trunk 220 is a blood collection tube made of light-transmitting glass or synthetic resin, and accommodates a sample. An opening 221 is formed at the upper end of the body 220. The stopper 210 is made of an elastic synthetic resin or the like. The stopper 210 seals the opening 221 at the upper end of the body 220 containing the sample. The lid 230 is made of plastic and covers the stopper 210 attached to the body 220 from the upper side. A hole 231 penetrating vertically is formed at the center of the lid 230. The identification member 201 is attached to the side surface of the body 220. The identification member 201 is a barcode label on which a barcode indicating sample information is printed. The sample information is information that can individually identify the sample.

Figure 5:
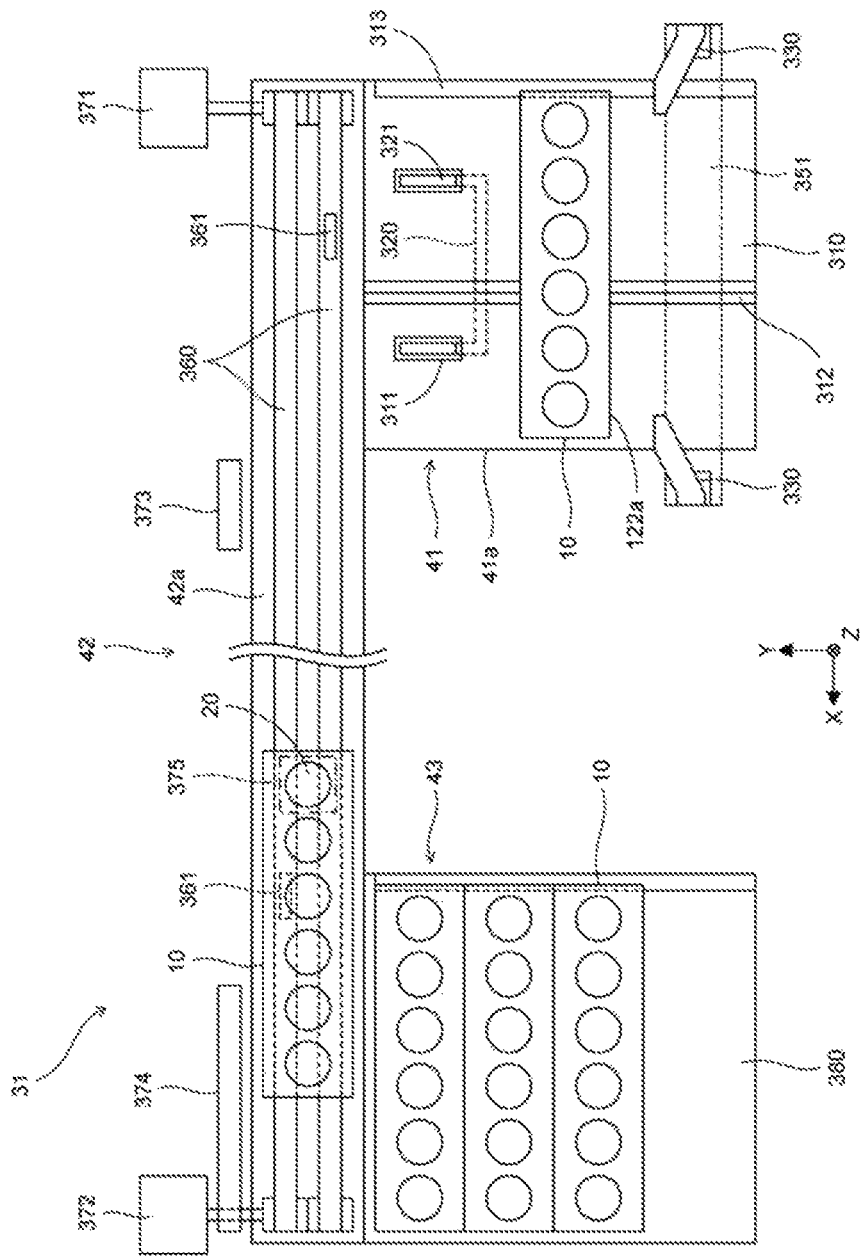
FIG. 5 is a schematic view showing the structure of the transport unit according to the first embodiment.

As shown in FIG. 5, the transport unit 31 includes a rack storage unit 41, a rack transport unit 42, and a rack collection unit 43.

A protrusion 312 extending in the Y-axis direction is provided on the upper surface of the support member 310. The protrusion 312 is provided at a position corresponding to the engagement part 133 of the sample rack 10. That is, the protrusion 312 is provided on the upper surface of the support member 310 such that the engagement part 133 of the sample rack 10 set in the rack storage unit 41 engages with the protrusion 312.

In this way, when the sample rack 10 is provided with the engagement part 133 and the rack storage unit 41 is provided with the protrusion 312, the movement of the sample rack 10 in the rack storage unit 41 can be performed when the engagement part 133 is along the protrusion 312. Therefore, the operator can reliably set the sample rack 10 in the rack storage unit 41 by sliding the sample rack 10 relative to the regulating member 320 in a state in which the engagement part 133 is along the protrusion 312. The feed member 330 for transporting the sample rack 10 set in the rack storage unit 41 to the transport path 42*a* can reliably transport the sample rack 10 to the transport path 42*a* along the transport direction.

A protrusion 313 extending in the Y-axis direction is formed at the end of the support member 310 on the X-axis negative side. The protrusion 313 provided on the side portion of the rack storage unit 41 is provided at a position corresponding to the engagement part 135 of the sample rack 10. That is, the protrusion 313 is provided at the X-axis negative end of the support member 310 such that the engagement part 135 of the sample rack 10 set in the rack storage unit 41 engages with the protrusion 313.

As described above, when the engagement part 135 is provided on the sample rack 10 and the protrusion 313 is provided on the rack storage unit 41, the movement of the sample rack 10 in the rack storage unit 41 is accomplished in a state in which the engagement part 135 is along the protrusion 313. Therefore, the operator can reliably set the sample rack 10 in the rack storage unit 41 by sliding the sample rack 10 relative to the regulating member 320 in a state in which the engagement part 135 is along the protrusion 313. The feed member 330 for transporting the sample rack 10 set in the rack storage unit 41 to the transport path 42*a* can reliably transport the sample rack 10 to the transport path 42*a* along the transport direction.

The two feed members 330 are disposed on a member 351 provided below the support member 310. The two feed members 330 move in the Y-axis direction by moving the member 351 in the Y-axis direction.

The rack transport unit 42 includes two belts 360, motors 371 and 372, a barcode reader 373, and pushing member 374. The transport path 42*a* of the rack transport unit 42 is configured by the upper surfaces of the two belts 360.

The two belts 360 extend parallel to each other in the X-axis direction, and are connected to pulleys at the X-axis positive side end and the X-axis negative side end. The motor 371 rotates a pulley to which the belt 360 on the Y-axis positive side is connected to drive the belt 360 on the Y-axis positive side. The motor 372 rotates a pulley to which the belt 360 on the Y-axis negative side is connected to drive the belt 360 on the Y-axis negative side. The two belts 360 each include one protrusion 361 that protrudes in the Z-axis negative direction. The width of the protrusion 361 in the X-axis direction is set such that the engagement part 134 of the sample rack 10 engages with the protrusion 361.

When the sample rack 10 is fed from the rack storage unit 41 to the rack transport unit 42, one of the two belts 360 is driven, and the protrusion 361 is aligned with the position of the engagement part 134 of the sample rack 10. In this state, the hooks 321 of the regulating member 320 are moved to the lower side of the bottom surface 41*a* of the rack storage unit 41, and the feed member 330 pushes the side surface 122*a* of the sample rack 10. In this way the sample rack 10 of the rack storage unit 41 is fed into the transport path 42*a* of the rack transport unit 42, and the engagement part 134 of the sample rack 10 engages with the protrusion 361 of the belt 360.

When a plurality of sample racks 10 are stored in the rack storage unit 41, the feed member 330 pushes the sample rack 10 on the utmost Y-axis negative side among the stored sample racks 10, and all the sample racks 10 are moved in the Y-axis direction. In this way the sample rack 10 located on the utmost Y-axis positive side is fed into the transport path 42*a*.

When the engagement part 134 of the sample rack 10 engages with the protrusion 361 of the belt 360, the sample rack 10 is transported in the X-axis positive direction by the belt 360 being driven while the engagement part 134 and the protrusion 361 are in the engaged state. In this way the sample rack 10 can be transported along the transport path 42a with a simple structure when the engagement part 134 is provided in the sample rack 10 and the protrusion 361 is provided in the belt 360. The rack transport unit 42 can be configured simply since the sample rack 10 can be transported to the suction position 375 provided in the rack transport unit 42 just by driving the belt 360.

The barcode reader 373 reads a barcode from the identification member 101 of the sample rack 10 transported by the rack transport unit 42, and the identification member 201 of the sample container 20 held by the sample rack 10. Thereafter, the sample rack 10 is transported in the X-axis direction so that the plurality of sample containers 20 being held are sequentially positioned at the suction position 375 of the measurement unit 32. When the suction of all the sample containers 20 is completed, the sample rack 10 is positioned at the X-axis positive side end of the transport path 42a. Then, the pushing member 374 pushes the side surface 121a on the Y-axis positive side of the sample rack 10 in the Y-axis negative direction, and feeds the sample rack 10 onto the support member 380 of the rack collection unit 43. In this way the sample rack 10 is collected by the rack collection unit 43.

Figure 6A:
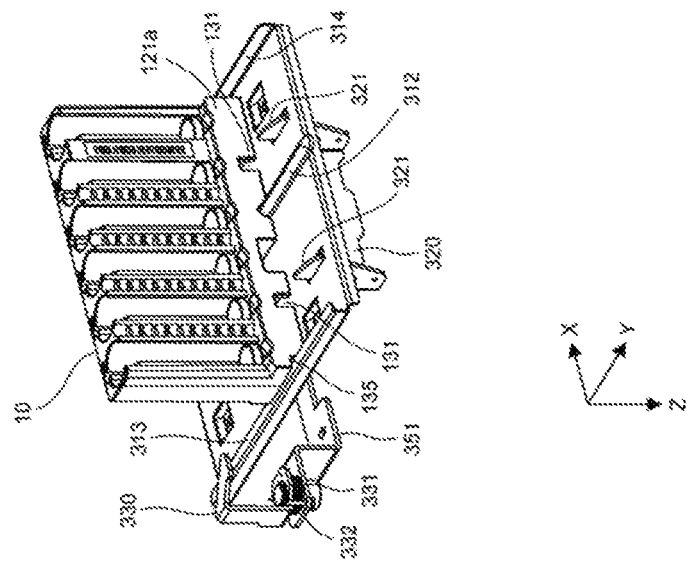
FIGS. 6A and 6B are perspective views showing the structures of the sample rack and the rack storage unit according to the first embodiment.
Figure 6B:
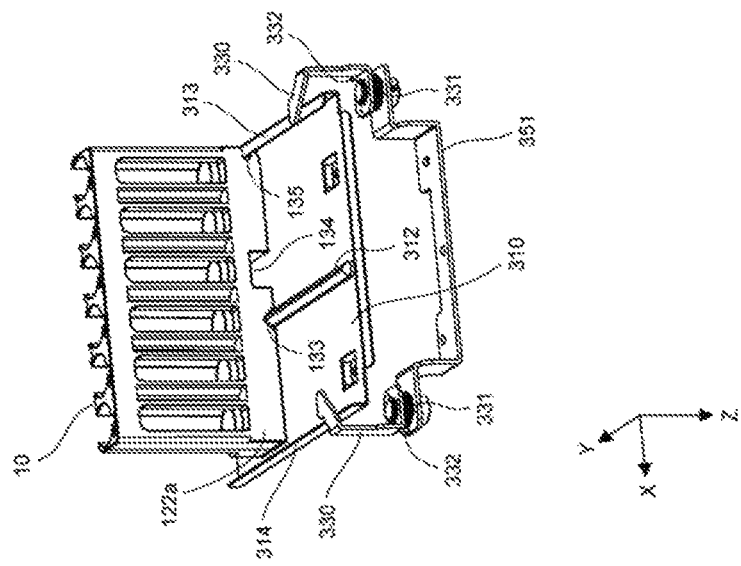

As shown in FIGS. 6A and 6B, the protrusion 312 provided on the upper surface of the support member 310 extends in the Y-axis direction, and has a triangular shape when viewed in the Y-axis direction. A protrusion 313 extending in the Y-axis direction is formed at the end of the support member 310 on the X-axis negative side. The protrusion 313 protrudes in the X-axis negative direction relative to a wall member parallel to the YZ plane formed on the upper surface of the support member 310. The protrusion 313 is formed of a plate-like member parallel to the horizontal surface. A wall 314 extending in the Y-axis direction is formed at the end of the support member 310 on the X-axis positive side. The wall 314 is formed on the upper surface of the support member 310 and is formed of a plate-like member parallel to the YZ plane. The protrusion 313 and the wall 314 define the range of the rack storage unit 41 in the X-axis direction.

When setting the sample rack 10 in the rack storage unit 41, the operator engages the engagement part 135 of the sample rack 10 with the protrusion 313 in the X-axis negative direction, and engages the engagement part 133 of the sample rack 10 with the protrusion 312. In this way the sample rack 10 is properly disposed on the support member 310. Then, the operator manually moves the sample rack 10 placed on the support member 310 in the Y-axis positive direction. The hooks 321 of the regulating member 320 are provided at positions corresponding to the notches 131. Thus, the hooks 321 protruding upward from the upper surface of the support member 310 enter the interior of the sample rack 10 through the notches 131 and are pressed against the wall 132 as described above.

The regulating member 320 includes the two hooks 321 at positions corresponding to the two notches 131 of the sample rack 10, so that the movement of the sample rack 10 can be stably regulated. Note that the number of hooks 321 provided on the regulating member 320 is not limited to two, and may be one or three or more in accordance with the number of the notches 131.

The two feed members 330 are respectively installed at the X-axis positive side end and the X-axis negative side end of the member 351. The feed member 330 is installed on the member 351 so as to be rotatable about the Z-axis. The X-axis positive feed member 330 is biased by the spring 331 so as to rotate counterclockwise as viewed in the Z-axis positive direction, and the X-axis negative feed member 330 is biased by a spring 331 so as to rotate clockwise in the Z-axis positive direction. The rotational position when the feed member 330 feeds the sample rack 10 is fixed by the feed member 330 abutting against the stopper 332.

When the feed member 330 feeds the sample rack 10, the feed member 330 is moved by the member 351 from the Y-axis negative side end of the rack storage unit 41 in the Y-axis positive direction so as to push the side surface 122a on the Y-axis negative side of the sample rack 10. When the feed is completed, the feed member 330 is returned to the Y-axis negative end side of the rack storage unit 41. At this time, if the sample rack 10 is in the rack storage unit 41, the feeding member 330 rotates around the Z-axis by hitting the side surface 121a on the Y-axis positive side of the sample rack 10, and retracts from the interior of the rack storage unit 41. In this way the feed member 330 is returned to the Y-axis negative side end of the rack storage unit 41 without obstructing the sample rack 10.

As shown in FIGS. 7A and 7B, the regulating member 320 is rotated by the drive unit 340 with the shaft 322 as the center of rotation. The shaft 322 extends in the X-axis direction and is fixed in the transport unit 31.

The drive unit 340 includes a rotation member 341, a shaft 342, a connection member 343, and a spring 344. The rotating member 341 is supported by the shaft 342 so as to be rotatable with the shaft 342 as the center of rotation. The shaft 342 extends in the X-axis direction and is fixed in the transport unit 31. The rotating member 341 includes a flange 341a for connecting a spring 344 near the end on the Z-axis negative side. The connection member 343 connects the upper end of the rotating member 341 and the lower end of the regulating member 320. One end of the spring 344 is connected to the flange 341a of the rotation member 341, and the other end is fixed in the transport unit 31.

As shown in FIG. 7A, when the lower end of the rotation member 341 is moved in the Y-axis negative direction against the contraction force of the spring 344, the rotation member 341 rotates clockwise as viewed in the X-axis positive direction. In this way the upper end of the rotation member 341 moves in the Y-axis positive direction, and the connection member 343 moves in the Y-axis positive direction. When the connection member 343 moves in the positive Y-axis direction, the regulating member 320 rotates counterclockwise as viewed in the positive X-axis direction. In this way the hooks 321 of the regulating member 320 move in the Y-axis negative direction, and the hooks 321 protrude into the rack storage 41.

As shown in FIG. 7B, when the lower end of the rotating member 341 is moved in the Y-axis positive direction according to the contraction force of the spring 344, the rotating member 341 rotates counterclockwise as viewed in the X-axis positive direction. In this way the upper end of the rotating member 341 moves in the negative Y-axis direction, and the connection member 343 moves in the negative Y-axis direction. When the connection member 343 moves in the Y-axis negative direction, the regulating member 320 rotates clockwise as viewed in the X-axis positive direction. In this way the hooks 321 of the regulating member 320 move in the Y-axis positive direction, and the hooks 321 are retracted from the rack storage unit 41.

Figure 8:
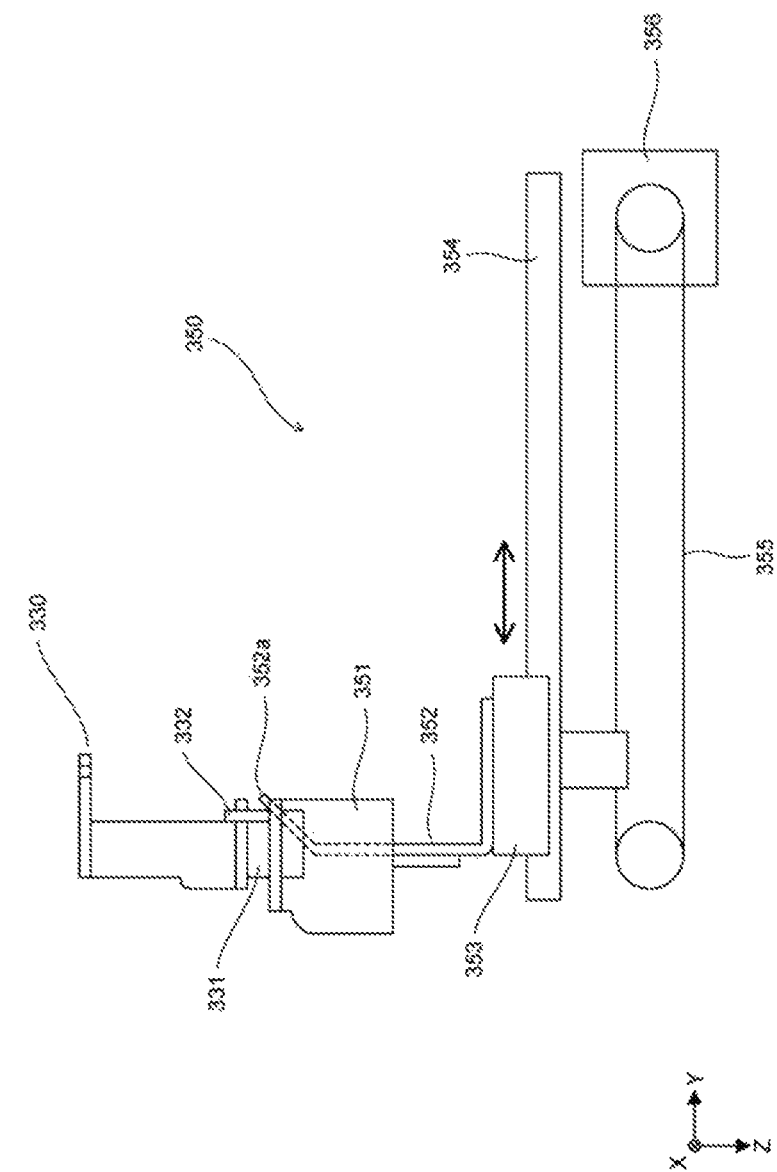
FIG. 8 is a side view schematically showing the structure of a feed member and a drive unit for driving the feed member according to the first embodiment.

As shown in FIG. 8, the two feed members 330 are installed in the drive unit 350 and moved in the Y-axis direction by the drive unit 350. In FIG. 8, only the X-axis negative side feed member 330 is shown.

The drive unit 350 includes members 351 and 352, a moving member 353, a rail 354, a belt 355, and a motor 356. The feed member 330 is disposed on a member 351 extending in the X-axis direction. The member 351 is disposed on an L-shaped member 352 as viewed in the X-axis direction. The lower end of the member 352 is disposed on the upper surface of the moving member 353. The moving member 353 is installed on the rail 354 so as to be movable on the rail 354 extending in the Y-axis direction. The moving member 353 is installed on a belt 355 extending in the Y-axis direction. The belt 355 is connected to the pulleys at the Y-axis positive side end and the Y-axis negative side end. The motor 356 rotates the pulley to which the belt 355 is connected to drive the belt 355.

The motor 356 is driven when moving the feed member 330 in the Y-axis direction. In this way the moving member 353 moves in the Y-axis direction according to the movement of the belt 355, and the feed member 330 moves in the Y-axis direction according to the movement of the members 351 and 352.

Here, at the upper end of the member 352, a flange 352a is formed at an incline in the Y-axis direction. The flange 352a is positioned on the Y-axis positive side of the inner side surface 341b of the rotating member 341 shown in FIGS. 7A and 7B. When the feed member 330 is moved to the Y-axis negative side end of the rack storage unit 41, the flange 352a pushes the vicinity of the lower end of the inner side surface 341b of the rotating member 341 in the Y-axis negative direction. In this way the regulating member 320 is in a state of protruding into the rack storage unit 41 as shown in FIG. 7A. On the other hand, when the feed member 330 is moved in the Y-axis positive direction from the Y-axis negative side end of the rack storage unit 41, the flange 352a separates from the lower end of the inner side surface 341b of the rotation member 341. In this way the regulating member 320 is retracted from the inside of the rack storage unit 41 as shown in FIG. 7B.

Although the drive of the regulating member 320 was performed according to the drive of the feed member 330, a separate motor for driving the regulating member 320 also may be provided, for example, so that the regulating member 320 can be driven independently.

Figure 9:
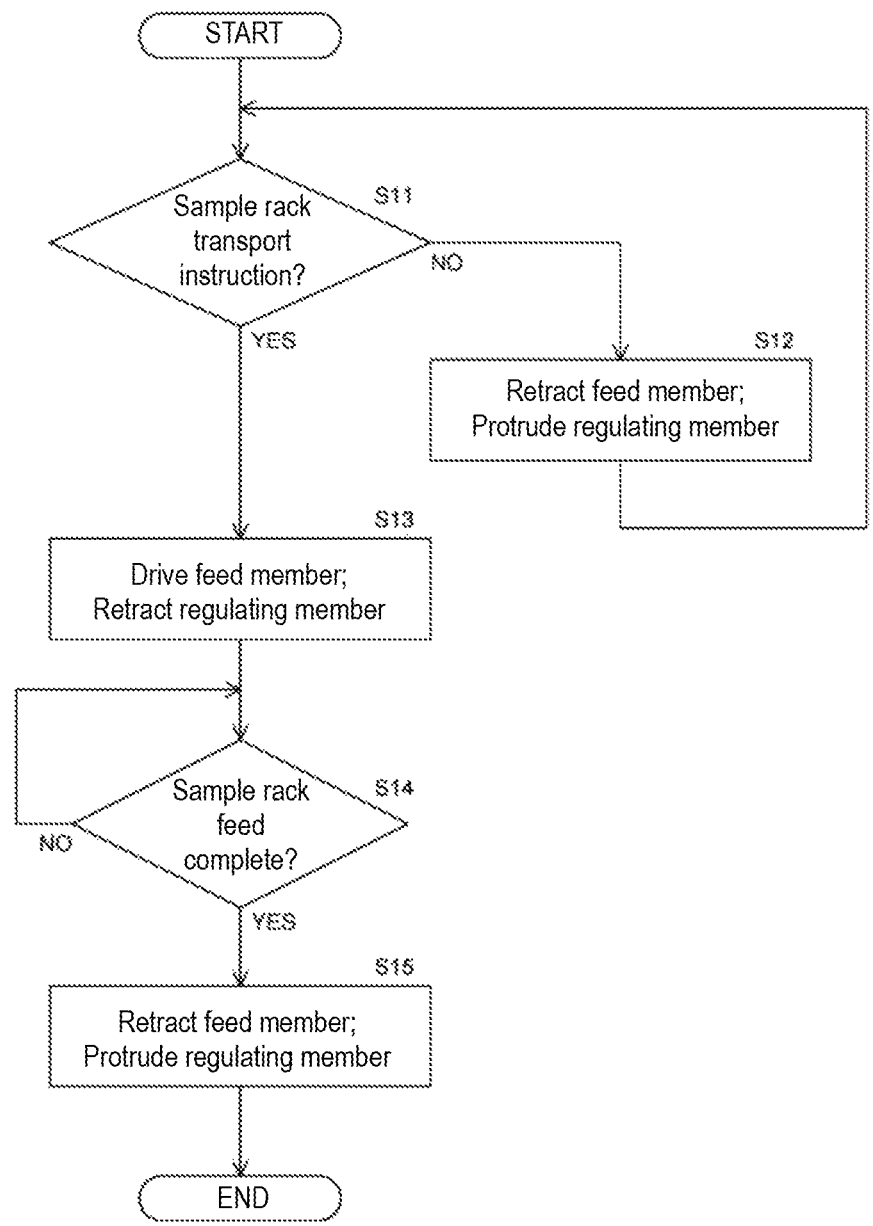
FIG. 9 is a flowchart showing drive control of the feed member and the regulating member according to the first embodiment.

FIG. 9 is a flowchart showing the drive control of the feed member 330 and the regulating member 320. The drive control shown in FIG. 9 is performed by a control unit 32a of a measurement unit 32 described later. The drive control also may be performed by a control unit 33a of the analysis unit 33 described later, or may be performed by an external device other than the sample analyzer 30. When the control unit is provided in the transport unit 31, the control unit of the transport unit 31 also may perform drive control.

In step S11, the control unit 32a determines whether there is an instruction to send the sample rack 10 of the rack storage unit 41 to the transport path 42a. If there is no feed instruction, in step S12 the control unit 32a drives the motor 356 shown in FIG. 8 to retract the feed member 330 to the Y-axis negative side end of the rack storage unit 41. In this way the flange 352a shown in FIG. 8 pushes the vicinity of the lower end of the inner side surface 341b of the rotating member 341 shown in FIG. 7A in the Y-axis negative direction, and the regulating member 320 enters the interior of the rack storage unit 41. The operator sets the sample rack 10 in the rack storage unit 41 in this state. After step S12, the process returns to step S11 again, and the determination of step S11 is performed.

When there is a feed instruction, in step S13 the control unit 32a drives the motor 356 to move the feed member 330 in the Y-axis positive direction, and transports the sample rack 10 from the rack storage unit 41 to the transport path 42a of the rack transport unit 42. At this time, the flange 352a is separated from the inner side surface 341b of the rotating member 341 shown in FIG. 7B, and the regulating member 320 retracts from the interior of the rack storage unit 41. As described above, when the regulating member 320 retracts from the interior of the rack storage unit 41, the sample rack 10 can be smoothly fed from the rack storage unit 41 to the transport path 42a.

Thereafter, in step S14 the control unit 32a determines whether the process of feeding the sample rack 10 to the transport path 42a is completed. When the feeding of the sample rack 10 is completed, the control unit 32a retracts the feeding member 330 to the Y-axis negative side end of the rack storage unit 41 in step S15, similar to step S12. In this way the regulating member 320 protrudes inside the rack storage unit 41. In this way, when the process ends, the process is started again from step S11, and the drive control of FIG. 9 is repeatedly performed.

Figure 10:
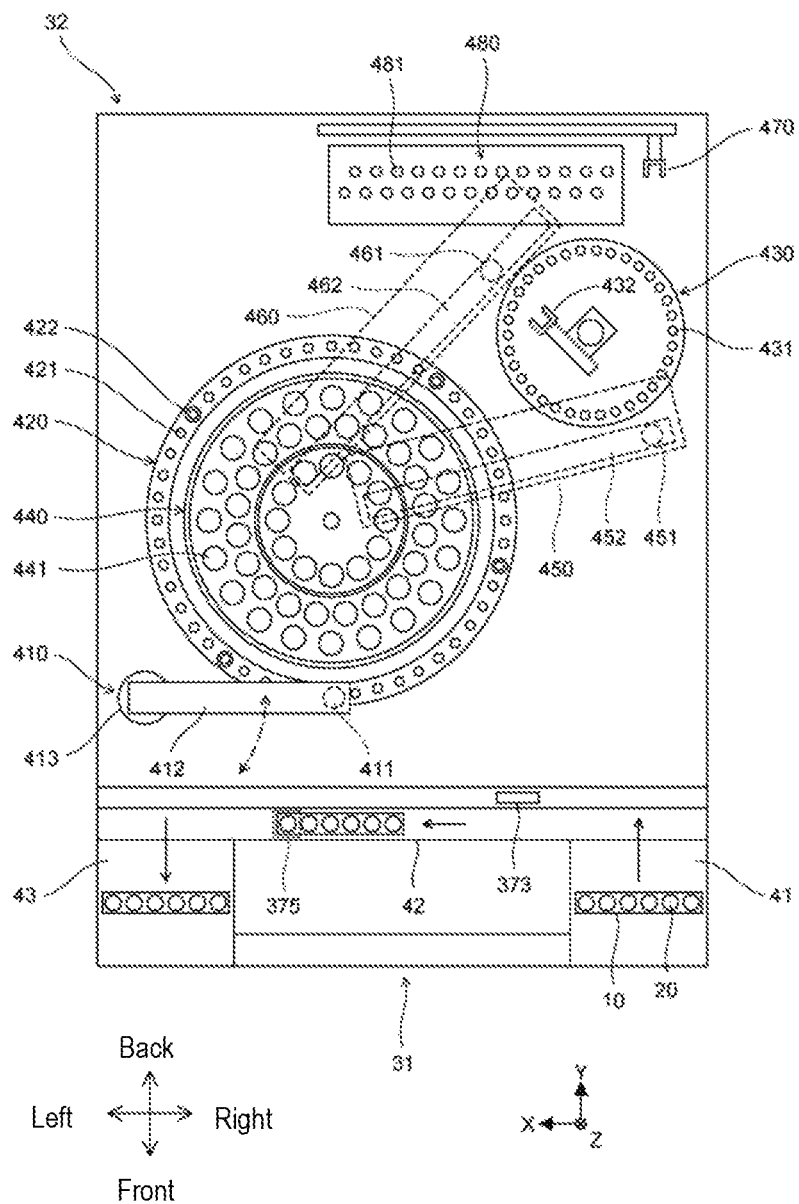
FIG. 10 is a schematic view showing the structure when the transport unit and the measurement unit according to the first embodiment are viewed from above.

In the first embodiment shown in FIG. 10, the transport unit 31 is disposed in front of the measurement unit 32. The measurement unit 32 performs measurement regarding a blood coagulation test. Therefore, in the first embodiment the sample contained in the sample container 20 and transported by the sample rack 10 is plasma.

Note that the liquid stored as the sample in the sample container 20 is not limited to plasma. That is, the sample contained in the sample container 20 and transported by the sample rack 10 is not limited to plasma, and may be whole blood, serum, urine, lymph fluid, body cavity fluid or the like. For example, when the measurement unit 32 performs a blood test on the sample, the sample may be whole blood. For example, when the measurement unit 32 performs measurement of a blood coagulation test, immunoassay test, or biochemical test on the sample, the sample may be plasma. For example, when the measurement unit 32 performs measurement of an immunological test or a biochemical test on the sample, the sample may be serum.

The measurement unit 32 includes a sample dispensing unit 410, a reaction container table 420, a heating table 430, a reagent table 440, reagent dispensing units 450 and 460, a transfer unit 470, and a detection unit 480. The measurement unit 32 measures the sample transported through the transport path 42a.

The sample dispensing unit 410 includes a nozzle 411, an arm 412, and a mechanical unit 413. The nozzle 411 is installed at the tip of the arm 412. The tip of the nozzle 411 is pointed so as to penetrate the stopper 210 of the sample container 20. The mechanical unit 413 is configured to rotate the arm 412 in the circumferential direction and to move the arm in the vertical direction. In this way the nozzle 411 can move in the circumferential direction and in the vertical direction.

The sample dispensing unit 410 lowers the nozzle 411 from the upper side of the sample container 20 positioned at the suction position 375 to pierce the stopper 210. Then, the sample dispensing unit 410 suctions the sample from the sample container 20 via the nozzle 411, and discharges the suctioned sample to the reaction container 422 held by the holding hole 421 of the reaction container table 420.

The reaction container table 420 has an annular shape in plan view, and is disposed on the outside of the reagent table 440. The reaction container table 420 is configured to be rotatable in the circumferential direction. The reaction container table 420 has a plurality of holding holes 421 for holding the reaction container 422.

The heating table 430 includes a plurality of holding holes 431 for holding the reaction container 422, and a transfer unit 432 for transferring the reaction container 422. The heating table 430 has a circular outline in plan view, and is configured to be rotatable in the circumferential direction. The heating table 430 heats the reaction container 422 set in the holding hole 431 to 37° C.

When a sample is discharged to the reaction container 422 held on the reaction container table 420, the reaction container table 420 is rotated, and the reaction container 422 containing the sample is transported to the vicinity of the heating table 430. Then, the transfer unit 432 of the heating table 430 grasps the reaction container 422 and sets the reaction container 422 in the holding hole 431 of the heating table 430.

The reagent table 440 is configured to be able to have a plurality of reagent containers 441 containing reagents used for measurement related to a blood coagulation test. The reagent table 440 is configured to be rotatable in the circumferential direction. On the reagent table 440, a plurality of reagent containers 441 containing reagents used in measurement of measurement items are installed.

The reagent dispensing unit 450 includes a nozzle 451 and a mechanical unit 452. The mechanical unit 452 is configured to move the nozzle 451 in the horizontal direction so as to cross the reagent table 440 and to move the nozzle 451 in the vertical direction. Similarly, the reagent dispensing unit 460 includes a nozzle 461 and a mechanical unit 462.

The mechanical unit 462 is configured to move the nozzle 461 in the horizontal direction so as to cross the reagent table 440 and to move the nozzle 461 in the vertical direction. The reagent dispensing units 450 and 460 are installed below the upper surface of the measuring unit 32.

The reagent dispensing units 450 and 460 dispense the reagent into the reaction container 422 heated by the heating table 430. When dispensing the reagent, the transfer unit 432 or the transfer unit 470 removes the reaction container 422 from the holding hole 431 of the heating table 430, and positions the reaction container 422 at a predetermined position near the heating table 430. Then, the reagent dispensing unit 450, 460 suctions the reagent from the reagent container 441 through the nozzles 451, 461, and discharges the suctioned reagent to the reaction container 422. In this way the reagent is mixed with the sample to prepare a measurement sample. Thereafter, the transfer unit 470 sets the reaction container 422 in the holding hole 481 of the detection unit 480.

The measurement principle of the detection unit 480 is, for example, a coagulation method, a synthetic substrate method, an immunoturbidimetric method, an agglutination method, or the like. The detection unit 480 includes a plurality of holding holes 481. The detection unit 480 irradiates light on the reaction container 422 set in the holding hole 481, receives the light transmitted through the measurement sample, and outputs a signal according to the intensity of the received light. The control unit 32a of the measurement unit 32 stores the signal output from the detection unit 480 as a measurement result, and transmits the measurement result to the analysis unit 33.

Figure 11:
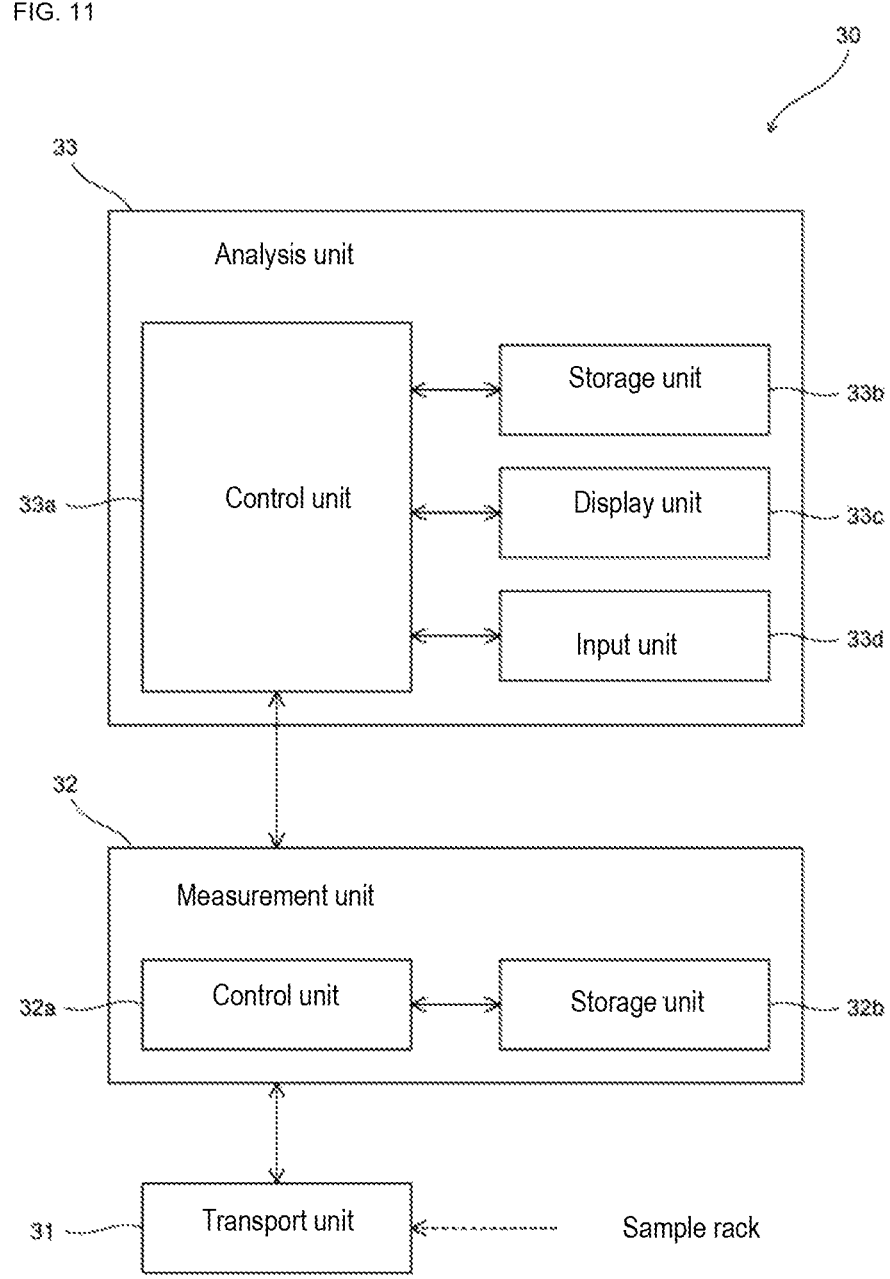
FIG. 11 is a block diagram showing the structure of a sample analyzer according to the first embodiment.

As shown in FIG. 11, the sample analyzer 30 includes a transport unit 31, a measurement unit 32, and an analysis unit 33.

The measurement unit 32 includes a control unit 32a, a storage unit 32b, and various mechanical units used for the measurement shown in FIG. 10. Control unit 32a is, for example, a CPU. The storage unit 32b is, for example, a ROM, a RAM, and a hard disk. The control unit 32a controls each unit in the measurement unit 32 and the transport unit 31 in accordance with a program and data stored in the storage unit 32b. The control unit 32a suctions the sample supplied by the transport unit 31, measures the blood coagulation test for the sample, and transmits the measurement result to the analysis unit 33.

The analysis unit 33 includes a control unit 33a, a storage unit 33b, a display unit 33c, and an input unit 33d. Control unit 33a is, for example, a CPU. The storage unit 33b is, for example, a ROM, a RAM, and a hard disk. The control unit 33a controls each unit in the analysis unit 33 and the measurement unit 32 according to a program and data stored in the storage unit 33b. The display unit 33c is, for example, a liquid crystal display. The input unit 33d is, for example, a mouse or a keyboard. The display unit 33c and the input unit 33d may be integratedly configured by a touch panel display or the like.

The control unit 33a analyzes the blood coagulation test on the sample based on the measurement result received from the measurement unit 32. Specifically, the control unit 33a analyzes measurement items including PT, APTT, Fbg, extrinsic coagulation factor, intrinsic coagulation factor, coagulation factor XIII, HpT, TTO, FDP, D dimer, PIC, FM, ATIII, Plg, APL, PC, VWF: Ag, VWF: RCo, ADP, collagen, epinephrine.

Next, another embodiment of the sample rack 10 will be described. In the second and third embodiments described below, the structures other than the sample rack 10 are the same as those of the first embodiment.

Second Embodiment

As shown in FIG. 12A, in the sample rack 10 of the second embodiment, no cavity is provided inside the pedestal 120 as compared to the first embodiment, and the bottom surface 120a of the pedestal 120 spreads in the horizontal direction. The notch 131 of the second embodiment is formed as a groove connecting from the side surface 121a to the bottom surface 120a. As in the first embodiment, a wall 132 is provided at the end of the notch 131 on the Y-axis negative side. The engagement parts 133 and 134 in the second embodiment are formed as grooves that extend from the side surface 121a through the bottom surface 120a to the side surface 122a.

Also in the second embodiment, as in the first embodiment, while the regulating member 320 enters the notch 131 of the sample rack 10, the entering of the regulating member 320 is regulated by the wall 132 at a predetermined position up to the side surface 122a. In this way, as in the first embodiment, the rack storage unit 41 can be reduced in size while ensuring the extent to which a number of sample racks 10 can be set in the rack storage unit 41.

Note that the wall 132 located at the Y-axis negative side end of the notch 131 is not limited to being provided at a position close to the side surface 122a as shown in FIGS. 4A and 12A. For example, as shown in FIG. 12B, the wall 132 may be separated from the side surface 122a in the Y-axis positive direction. When the wall 132 is separated from the side surface 122a, although the regulating member 320 can enter the interior of the sample rack 10 as compared with when the regulating member 320 abuts the side surface 121*a* as in the comparative example of FIG. 3B, the regulating member 320 cannot enter to a position near the side surface 122*a*. In this case, the sample rack 10 located at the utmost Y-axis positive side cannot be disposed close to the transport path 42*a* to the same degree as shown in FIG. 3A. Accordingly, the wall 132 of the sample rack 10 is preferably provided at a position close to the side surface 122*a*.

The engagement part 133 also is not limited to a triangular shape when viewed in the Y-axis direction. For example, the engagement part 133 may have a rectangular shape as viewed in the Y-axis direction as shown in FIG. 12B. In this case, the protrusion 312 of the rack storage unit 41 engaged with the engagement part 133 has a rectangular shape as viewed in the Y-axis direction in accordance with the shape of the engagement part 133. The engagement part 134 is not limited to a rectangular shape when viewed in the Y-axis direction. For example, the engagement part 134 may have a triangular shape as viewed in the Y-axis direction as shown in FIG. 12B. In this case, the protrusion 361 of the belt 360 with which the engagement part 134 is engaged has a triangular shape as viewed in the Y-axis direction in accordance with the shape of the engagement part 134. The engagement part 135 is not limited to a rectangular shape when viewed in the Y-axis direction. For example, the engagement part 135 may have a triangular shape as viewed in the Y-axis direction as shown in FIG. 12B. In this case, the protrusion 313 of the rack storage unit 41 with which the engagement part 135 engages has a triangular shape as viewed in the Y-axis direction in accordance with the shape of the engagement part 135.

The wall 132 also may not necessarily be provided at a position facing the notch 131, and may be provided at a position corresponding to the notch 131. For example, when the hook 321 of the regulating member 320 enters in a direction having an inclination on the YZ plane relative to the inside of the sample rack 10, as shown in FIG. 13A, the wall 132 may be provided at a position at which the hook 321 entering the interior of the sample rack 10 abuts the walls 132. In this way even when the notch 131 and the wall 132 do not face in the Y-axis direction, movement of the sample rack 10 is regulated by the hook 321 entering in a direction having an inclination in the YZ plane and abutting the wall 132. However, when the wall 132 is provided at a position facing the notch 131, the structure and drive of the regulating member 320 can be simplified.

The wall 132 also need not necessarily be parallel to the XZ plane. For example, as shown in FIG. 13B, the wall 132 may be inclined relative to the XZ plane at a position facing the notch 131. Also in this case, the movement of the sample rack 10 is regulated by the hook 321 entering the sample rack 10 via the notch 131 coming into contact with the wall 132. Note that in the example shown in FIG. 13A the wall 132 also may be inclined with respect to the XZ plane.

Figures 14A, 14B:
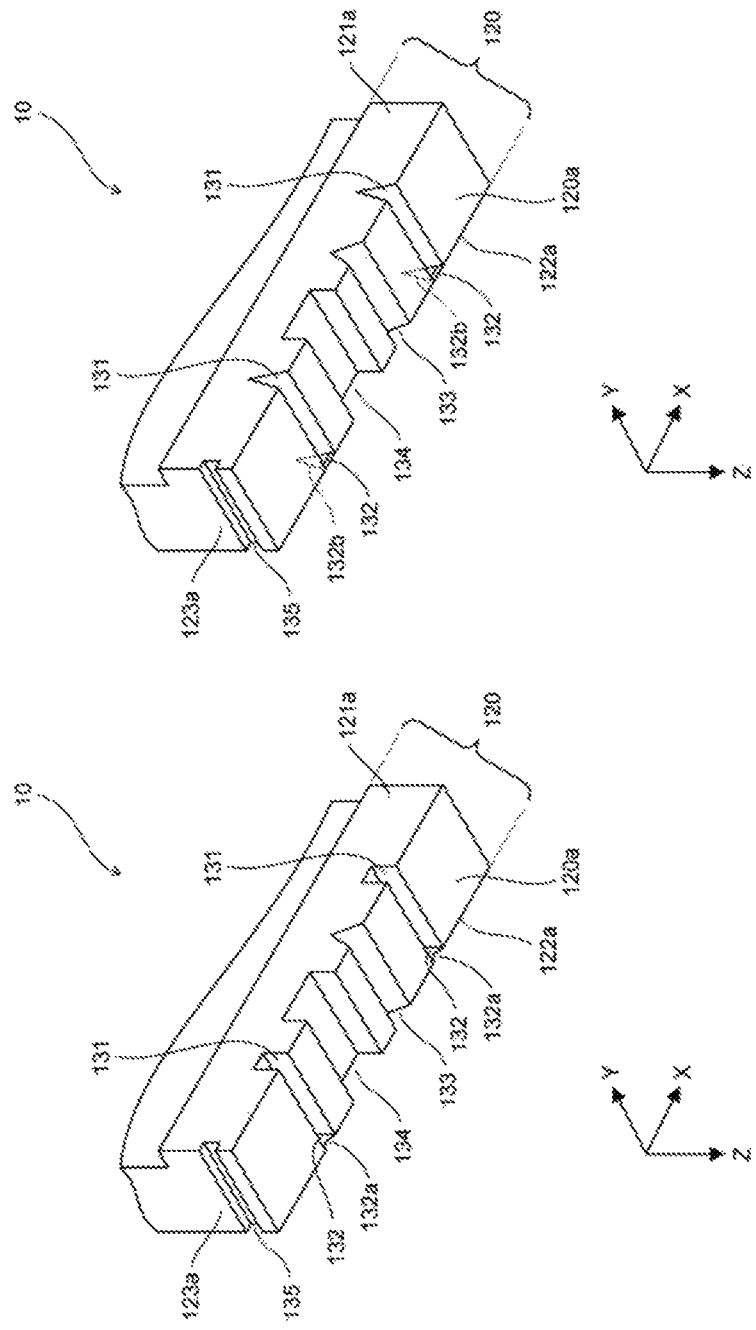
FIG. 14A is a perspective view schematically showing the structure of a sample rack according to a modification of the second embodiment.
FIG. 14B is a perspective view schematically showing the structure of a sample rack according to a modification of the second embodiment.
Figure 16:
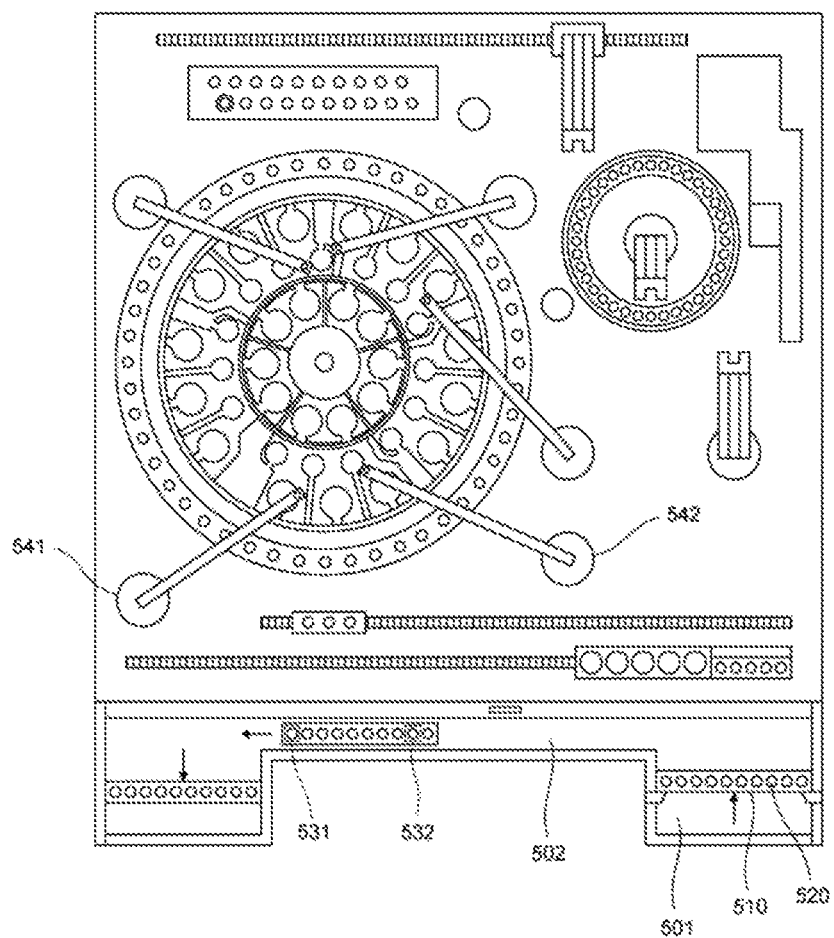
FIG. 16 is a schematic view illustrating the structure according to the related art.

The lower end of the wall 132 need not necessarily configure the bottom surface 120*a* of the pedestal 120, and the wall 132 may be configured so that the hook 321 of the regulating member 320 abuts the wall 132 of the sample rack 10 set in the rack storage unit 41. For example, as shown in FIG. 14A, at the lower end of the wall 132, a notch 132*a* that is smaller than the notch 131 may be provided. Also in this case, the movement of the sample rack 10 is regulated by the hook 321 of the regulating member 320 entering the sample rack 10 via the notch 131 and coming into contact with the wall 132.

Further, the notch 131 is not limited to a rectangular shape when viewed in the Y-axis direction. For example, as shown in FIG. 14B, the notch 131 may have a triangular shape as viewed in the Y-axis direction. The wall 132 does not necessarily have to be a flat surface, and the hook 321 entering the sample rack 10 via the notch 131 may abut the wall 132. For example, the wall 132 may be a surface having concavo-convexities. Further, as shown in FIG. 14B, the wall 132 may be configured by a rod-like portion. In the example shown in FIG. 14B, a hole 132*b* is formed above the rod-like wall 132 to open the interior of the sample rack 10 in the Y-axis negative direction. Also in this case, the movement of the sample rack 10 is regulated by the contact of the hook 321 with the wall 132 configured in a rod shape.

Third Embodiment

In the sample rack 10 of the third embodiment shown in FIGS. 15A and 15B, the notch 131 is not formed on the bottom surface 120*a* side of the sample rack 10, rather the notch 131 is formed on the plate member 123 side and the plate member 124 side of the sample rack 10.

As shown in FIG. 15A, the notch 131 formed on the plate member 123 side extends in the Y-axis negative direction from the side surface 121*a* along the side surface 123*a* on the X-axis negative side of the plate member 123. In this case a wall 132 also is provided at the end of the notch 131 on the Y-axis negative side. This notch 131 is provided on the Z-axis negative side of the engagement part 135 in the pedestal 120. Similarly, as shown in FIG. 15B, the notch 131 formed on the plate member 124 side extends from the side surface 121*a* in the Y-axis negative direction along the side surface 124*a* on the X-axis positive side of the plate member 124. In this case the wall 132 also is provided at the end on the Y-axis negative side of the notch 131.

As shown in FIG. 15C, the regulating member 320 of the third embodiment is provided on the X-axis positive side and the X-axis negative side of the rack storage unit 41, and is configured to be rotatable about the shaft 322 extending in the Z-axis direction as the center of rotation. In this case, when the regulating member 320 rotates, the hook 321 protrudes inside the rack storage unit 41 and abuts the wall 132 of the sample rack 10.

Also in the second embodiment, as in the first embodiment, while the regulating member 320 enters the notch 131 of the sample rack 10, the entering of the regulating member 320 is regulated by the wall 132 at a predetermined position up to the side surface 122*a*. In this way, as in the first embodiment, the rack storage unit 41 can be reduced in size while ensuring the extent to which a number of sample racks 10 can be set in the rack storage unit 41.

What is claimed is:

1. A sample analyzer for use with a sample rack holding a sample and the sample rack comprising a notch provided in the sample rack, the sample analyzer comprising:
   a rack storage unit in which the sample rack holding the sample is stored;
   a transport path connected to the rack storage unit;
   a measurement unit configured to measure the sample transported through the transport path;
   an analysis unit configured to analyze the sample based on the measurement result of the measurement unit; and
   a regulating member configured to protrude into an interior of the rack storage unit and regulate a movement of the sample rack from the rack storage unit to the transport path, wherein the regulating member is disposed at a position corresponding to the notch provided in the sample rack, and enters an interior of the sample rack from the notch and abuts an inner wall of the sample rack as the sample rack moves from the rack storage unit toward the transport path.

2. The sample analyzer according to claim 1, further comprising
a feed member configured to feed the sample rack stored in the rack storage unit to the transport path,
wherein the regulating member retracts from the interior of the rack storage unit when the feed member transfers the sample rack stored in the rack storage unit into the transport path.

3. The sample analyzer according to claim 1, wherein the regulating member includes at least two hooks at positions corresponding to at least two notches provided on a side surface of the sample rack.

4. The sample analyzer according to claim 1, further comprising
a protrusion provided on a bottom surface of the rack storage unit and extending in a transport direction of the sample rack in the rack storage unit,
wherein the protrusion provided on the bottom surface of the rack storage unit is disposed at a position corresponding to an engagement part provided on a bottom surface of the sample rack.

5. The sample analyzer according to claim 1, further comprising:
a protrusion disposed on a side portion of the rack storage unit and extending in a transport direction of the sample rack in the rack storage unit,
wherein the protrusion disposed on the side portion of the rack storage unit is provided at a position corresponding to an engagement part provided on a side surface of the sample rack.

6. The sample analyzer according to claim 1, further comprising
a rack transport unit configured to transport the sample rack in the transport path, and transport the sample held in the sample rack to a suction position of the measurement unit.

7. The sample analyzer according to claim 6, wherein
the rack transport unit includes a belt provided with a protrusion; and
the sample rack is transported in the transport path by driving the belt in a state in which the protrusion provided on the belt is engaged with an engagement part provided on the sample rack.

8. A transport regulation method for a sample analyzer for use with a sample rack holding a sample and the sample rack comprising a notch provided in the sample rack, the regulation method comprising:
regulating, with a regulating member, a transfer of the sample rack stored in a rack storage unit toward a transport path;
measuring, with a measurement unit a sample transported through the transport path;
analyzing, with an analysis unit, the sample based on the measurement result of the measurement unit;
operating the regulating member to protrude into an interior of the rack storage unit; and
operating the regulating member to enter an interior of the sample rack from the notch formed on a side surface of the sample rack so as to abut an inner wall of the sample rack as the sample rack stored in the rack storage unit moves toward the transport path.

* * * * *